United States Patent
Lou et al.

(10) Patent No.: US 11,122,444 B2
(45) Date of Patent: Sep. 14, 2021

(54) BEAMFORMING METHODS AND METHODS FOR USING BEAMS

(71) Applicant: InterDigital Patent Holdings, Inc., Wilmington, DE (US)

(72) Inventors: Hanqing Lou, Syosset, NY (US); Pengfei Xia, San Diego, CA (US); Monisha Ghosh, Chappaqua, NY (US); Oghenekome Oteri, San Diego, CA (US); Robert L. Olesen, Huntington, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 560 days.

(21) Appl. No.: 14/441,237

(22) PCT Filed: Nov. 8, 2013

(86) PCT No.: PCT/US2013/069265
§ 371 (c)(1),
(2) Date: May 7, 2015

(87) PCT Pub. No.: WO2014/074894
PCT Pub. Date: May 15, 2014

(65) Prior Publication Data
US 2015/0289147 A1 Oct. 8, 2015

Related U.S. Application Data

(60) Provisional application No. 61/724,679, filed on Nov. 9, 2012.

(51) Int. Cl.
*H04W 16/28* (2009.01)
*H04B 7/0408* (2017.01)
(Continued)

(52) U.S. Cl.
CPC .......... *H04W 16/28* (2013.01); *H04B 7/0408* (2013.01); *H04B 7/0413* (2013.01);
(Continued)

(58) Field of Classification Search
CPC .. H04B 7/0617; H04B 7/0404; H04B 7/0408; H04B 7/0413; H04B 7/0417;
(Continued)

(56) References Cited

U.S. PATENT DOCUMENTS 6,895,230 B1 * 5/2005 Blount ................... H04B 7/084
342/174
7,574,236 B1 * 8/2009 Mansour .............. H04B 7/0413
455/562.1
(Continued)

FOREIGN PATENT DOCUMENTS

| EP | 1266463 B1 | 6/2006 |
|---|---|---|
| EP | 2211483 A1 | 7/2010 |

(Continued)

OTHER PUBLICATIONS

Chen et al., "MAC and PHY Proposal for 802.11af", Document No. IEEE 802.11-10/0258r0, Mar. 2010, 23 pages.
(Continued)

*Primary Examiner* — Jae Y Lee
*Assistant Examiner* — Chuong M Nguyen
(74) *Attorney, Agent, or Firm* — Volpe Koenig

(57) ABSTRACT

A method, apparatus, system, and computer readable medium may be used to perform beamforming. The method may include a first communication device sending a first plurality of beamforming training frames to a second communication device using a first beamforming weight vector; the first communication device receiving from the second communication device a second beamforming weight vector; and the first communication device sending a second
(Continued)

plurality of beamforming training frames to the second communication device using the second beamforming weight vector. The apparatus, method, system, and computer readable media may use spatial diversity with beam switching, spatial diversity with a single beam, weighted multipath beamforming training, single user spatial multiplexing, and beamforming training for beam division multiple access (BDMA).

20 Claims, 23 Drawing Sheets

(51) Int. Cl.

| | | |
|---|---|---|
| H04B 7/0452 | (2017.01) | |
| H04B 7/06 | (2006.01) | |
| H04B 7/0417 | (2017.01) | |
| H04W 72/04 | (2009.01) | |
| H04W 88/08 | (2009.01) | |
| H04B 7/0413 | (2017.01) | |

(52) U.S. Cl.
CPC ......... *H04B 7/0417* (2013.01); *H04B 7/0452* (2013.01); *H04B 7/0634* (2013.01); *H04W 72/0453* (2013.01); *H04W 88/08* (2013.01)

(58) Field of Classification Search
CPC ... H04B 7/0634; H04B 7/0452; H04W 16/28; H04W 72/0453; H04W 88/08
See application file for complete search history.

(56) References Cited

U.S. PATENT DOCUMENTS

| | | | | |
|---|---|---|---|---|
| 7,873,113 | B2 | 1/2011 | Takano et al. | |
| 8,503,928 | B2 | 8/2013 | Wang et al. | |
| 8,842,640 | B2 | 9/2014 | Jeon et al. | |
| 2002/0193104 | A1* | 12/2002 | Scherzer | H04W 16/00 455/423 |
| 2003/0076274 | A1* | 4/2003 | Phelan | H01Q 3/26 343/895 |
| 2007/0207730 | A1* | 9/2007 | Nguyen | H01Q 1/246 455/39 |
| 2009/0080560 | A1* | 3/2009 | Na | H04B 7/0634 375/267 |
| 2009/0098838 | A1* | 4/2009 | Guo | H04B 7/0617 455/101 |
| 2009/0116444 | A1* | 5/2009 | Wang | H04B 7/0408 370/329 |
| 2009/0232010 | A1 | 9/2009 | Li et al. | |
| 2009/0323847 | A1* | 12/2009 | Na | H04B 7/0413 375/267 |
| 2010/0164804 | A1* | 7/2010 | Xu | H04B 7/0617 342/372 |
| 2011/0194637 | A1* | 8/2011 | Jiang | H04B 7/0617 375/267 |
| 2012/0082192 | A1* | 4/2012 | Pelletier | H04B 7/0678 375/219 |
| 2012/0188889 | A1* | 7/2012 | Sambhwani | H04B 7/0404 370/252 |
| 2012/0243513 | A1 | 9/2012 | Fujishima et al. | |
| 2014/0003475 | A1* | 1/2014 | Xin | H04J 13/0055 375/219 |
| 2014/0247824 | A1* | 9/2014 | Sohn, III | H04W 74/002 370/338 |
| 2015/0077286 | A1* | 3/2015 | Linnig | G01S 13/02 342/146 |
| 2015/0289147 | A1* | 10/2015 | Lou | H04B 7/0408 370/329 |
| 2016/0105870 | A1* | 4/2016 | Won | H04B 7/0413 370/330 |

FOREIGN PATENT DOCUMENTS

| | | |
|---|---|---|
| JP | 2008-061253 A | 3/2008 |
| JP | 2008-092433 A | 4/2008 |
| JP | 2010028737 A | 2/2010 |
| JP | 2010-171648 A | 8/2010 |
| JP | 2012-506661 A | 3/2012 |
| JP | 2012-204974 A | 10/2012 |
| WO | WO 2009/093870 A2 | 7/2009 |
| WO | WO 2009/102124 A2 | 8/2009 |
| WO | WO 2010/050874 A1 | 5/2010 |
| WO | WO 2009/093870 A3 | 11/2010 |
| WO | 2011037907 A1 | 3/2011 |

OTHER PUBLICATIONS

Halasz, Dave, "Sub 1 GHz License-Exempt PAR and 5C", Document No. IEEE 802.11-10/0001r7, Jul. 2010, 8 pages.

IEEE, "Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY)", IEEE P802.11 ad™/D9.0 ,Sponsor: IEEE 802.11 Committee of the IEEE Computer Society, IEEE-SA Standards Board, Jul. 2012, 679 pages.

IEEE, "Draft Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, Amendment 5: Enhancements for Very High Throughput for Operation in Bands below 6 GHz", IEEE P802.11ac/D1.0, May 2011.

IEEE, "IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications", LAN/MAN Standards Committee of the IEEE Computer Society, IEEE Draft P802.11-REVmb™/D12, Nov. 2011, 2910 pages.

Jacob et al., "A Dynamic 60 GHz Radio Channel Model for System Level Simulations with MAC Protocols for IEEE 802.11ad", IEEE 14th International Symposium on Consumer Electronics, 2010, 5 pages.

Park et al., "A Spatial Diversity Technique for IEEE 802.11ad WLAN in 60 GHz Band", IEEE Communications Letters, vol. 16, No. 8, Aug. 2012, pp. 1260-1262.

Perahia et al., "Gigabit Wireless LANs: An Overview of IEEE 802.11ac and 802.11ad", ACM Sigmobile Mobile Computing and Communications Review, vol. 15, Issue 3, Jul. 2011, pp. 23-33.

Xia et al., "A Practical SDMA Protocol for 60 GHz Millimeter Wave Communications", Asilomar, 2008, pp. 2019-2023.

Xia et al., "Multi-Stage Iterative Antenna Training for Millimeter Wave Communications", Globecom, 2008, pp. 1-6.

Halasz, "Sub 1 GHz license-exempt PAR and 5C," IEEE 802.11-10/0001r13 (Jul. 2010).

IEEE 802.11n-2009, IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE P802.11af/D2.0, Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: TV White Spaces Operation, IEEE P802.11af/D2.0 (Jul. 2012).

Xing et al., "11aj 45GHz Link Budget for use cases discussion," 802.11-12/1320r0 (Nov. 2012).

(56) References Cited

OTHER PUBLICATIONS

Wang et al., "A Flexible Beam Training Protocol for 60GHz mm-Wave Communication (TGad)," IEEE 802.11-10/0496r2 (May 2010).

* cited by examiner

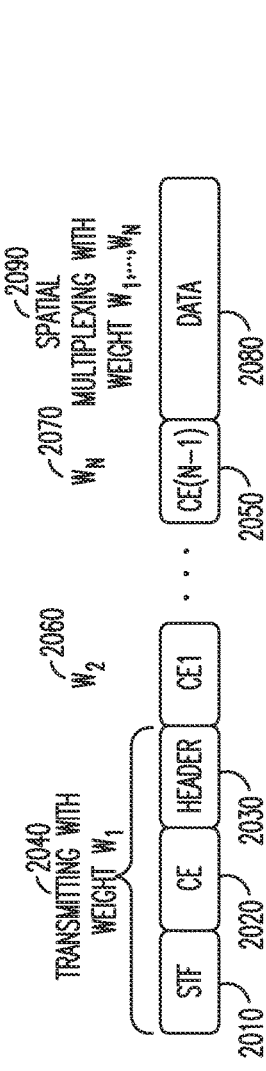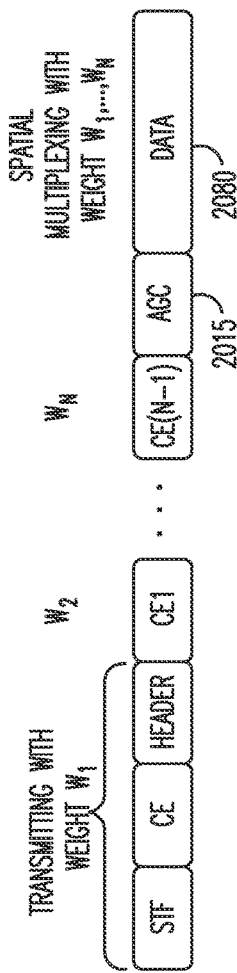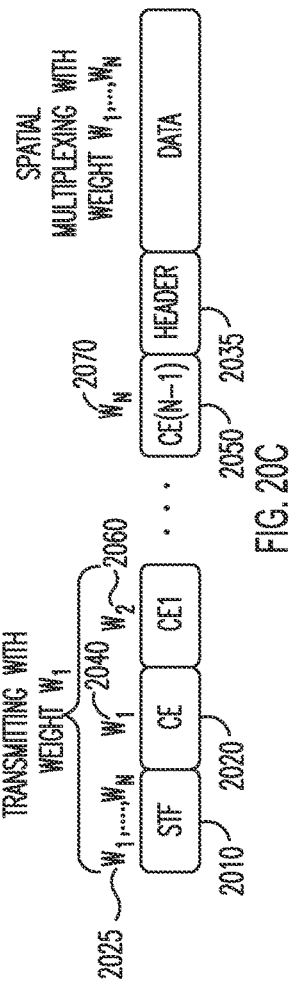

BEAMFORMING METHODS AND METHODS FOR USING BEAMS

CROSS REFERENCE TO RELATED APPLICATIONS

This application is the National Stage Entry under 35 U.S.C. § 371 Patent Cooperation Treaty Application No. PCT/US13/69265, filed Nov. 8, 2013, which claims the benefit of U.S. Provisional Application No. 61/724,679 filed Nov. 9, 2012, the contents of which are hereby incorporated by reference.

BACKGROUND

Some wireless communication networks support operation at very high and even extremely high carrier frequencies such as 60 GHz and millimeter wave (mmW) frequency bands. These extremely high carrier frequencies may support very high throughput such as up to 6 gigabits per second (Gbps). One of the challenges for wireless communication at very high or extremely high carrier frequencies is that a significant propagation loss may occur due to the high carrier frequency. As the carrier frequency increases, the carrier wavelength may decrease, and the propagation loss may increase as well.

At mmW frequency bands, the propagation loss may be severe. For example, the propagation loss may be on the order of 22 to 27 dB, relative to that observed in either the 2.4 GHz, or 5 GHz bands. Since the available spectrum is limited, however, and since users continue to demand more bandwidth, there is a need for effectively using very high and extremely high carrier frequencies for communication networks.

BRIEF DESCRIPTION OF THE DRAWINGS

FIG. 19 is a diagram of an example modified FBCK-TYPE subfield;

FIG. 20A is a diagram of an example PHY layer frame format;

FIG. 20B is a diagram of another example PHY layer frame format;

FIG. 20C is a diagram of another example PHY layer frame format;

SUMMARY

A first communication device for beamforming may include a plurality of antennas and a processor. The processor may be configured to partition the antenna into at least a first group of antennas and a second group of antennas. The processor may be further configured to send a plurality of beamforming training frames to a second communication device using the first group of antennas and the second group of antennas. The processor and/or a receiver may be configured to receive, from the second communication device, a first beamforming weight vector for sending signals on the first group of antennas and to receive a second beamforming weight vector for sending signals on the second group of antennas.

A method of beamforming training for beam division multiple access (BDMA) may include an AP transmitting Nt sequences modulated using Nt beamforming vectors. A first station may use a first previous beamforming vector to receive the Nt sequences and determine a first transmit beamforming weight from the AP to the first station based on the first previous beamforming vector and the received Nt sequences. The first station may send the determined first transmit beamforming weight to the AP. A second station may use a second previous beamforming vector to receive the Nt sequences and determine a second transmit beamforming weight from the AP to the first station based on the second previous beamforming vector and the received Nt sequences. The second station may send the determined second transmit beamforming weight to the AP, and the AP may transmit one or more sequences modulated based on the first transmit beamforming weight and the second transmit beamforming weight.

A method and apparatus may be used for spatial diversity with beam switching, spatial diversity with a single beam, weighted multipath beamforming training, single user spatial multiplexing, and for reduced beamforming training overhead.

DETAILED DESCRIPTION

Figure 1A:
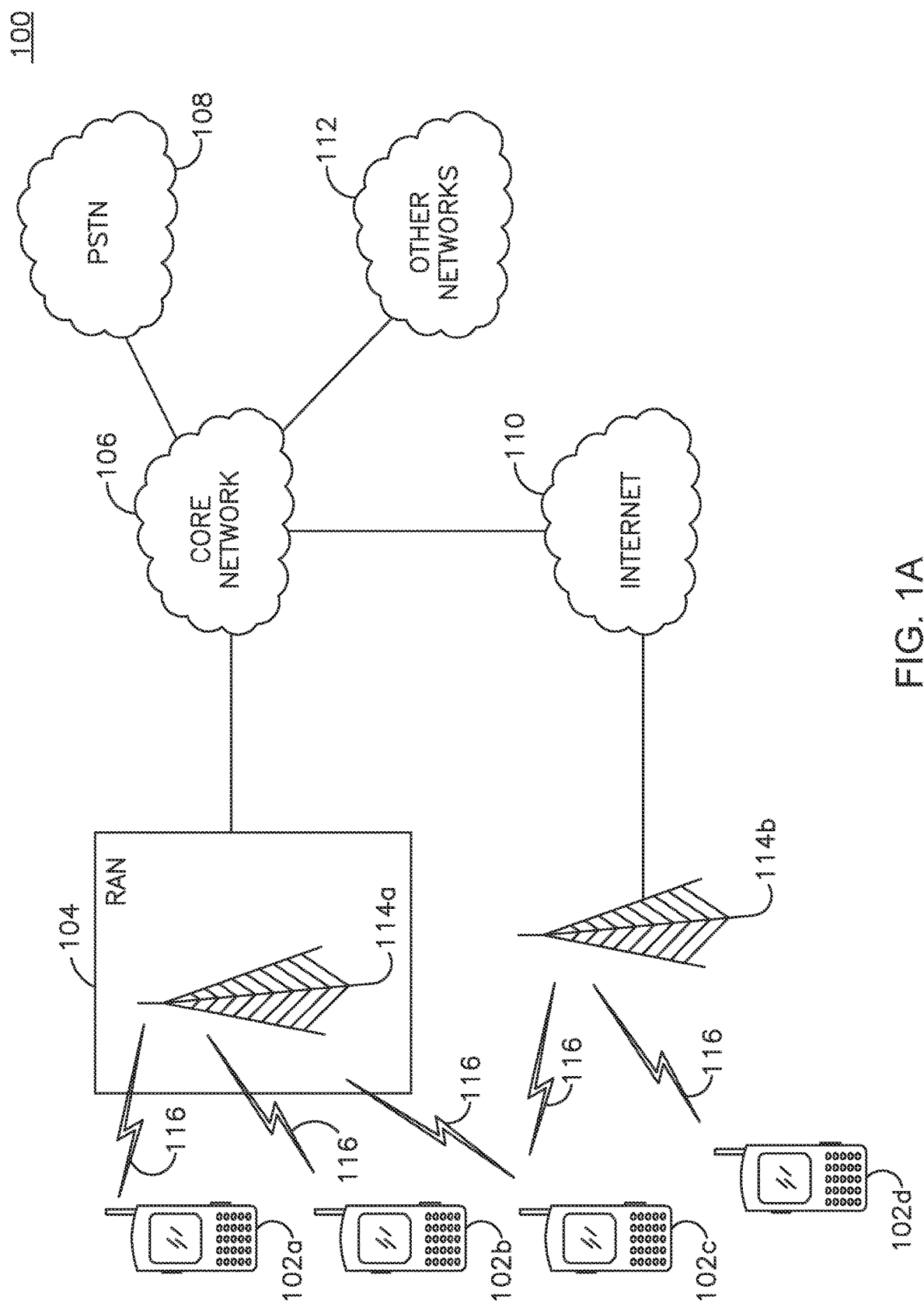
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
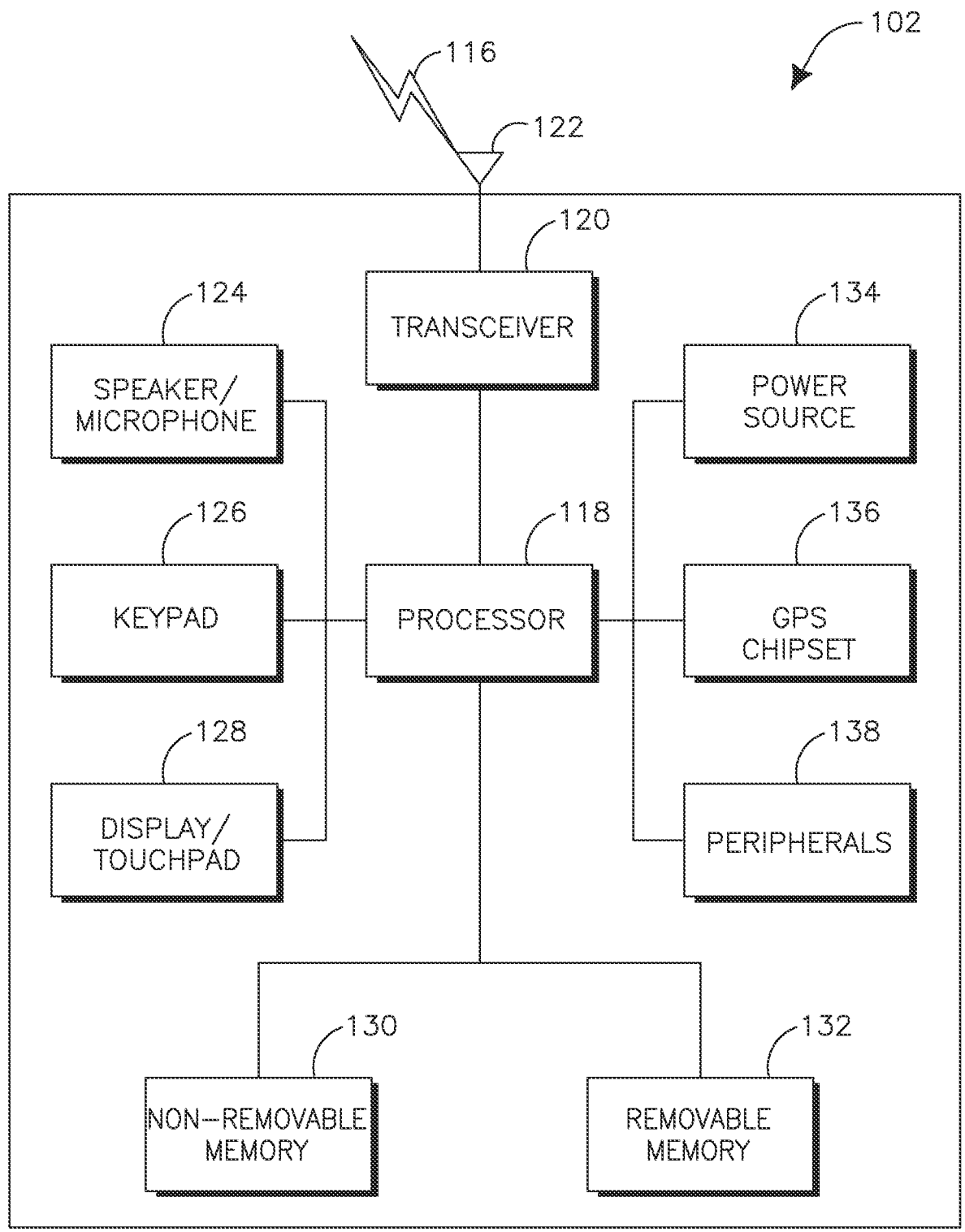
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
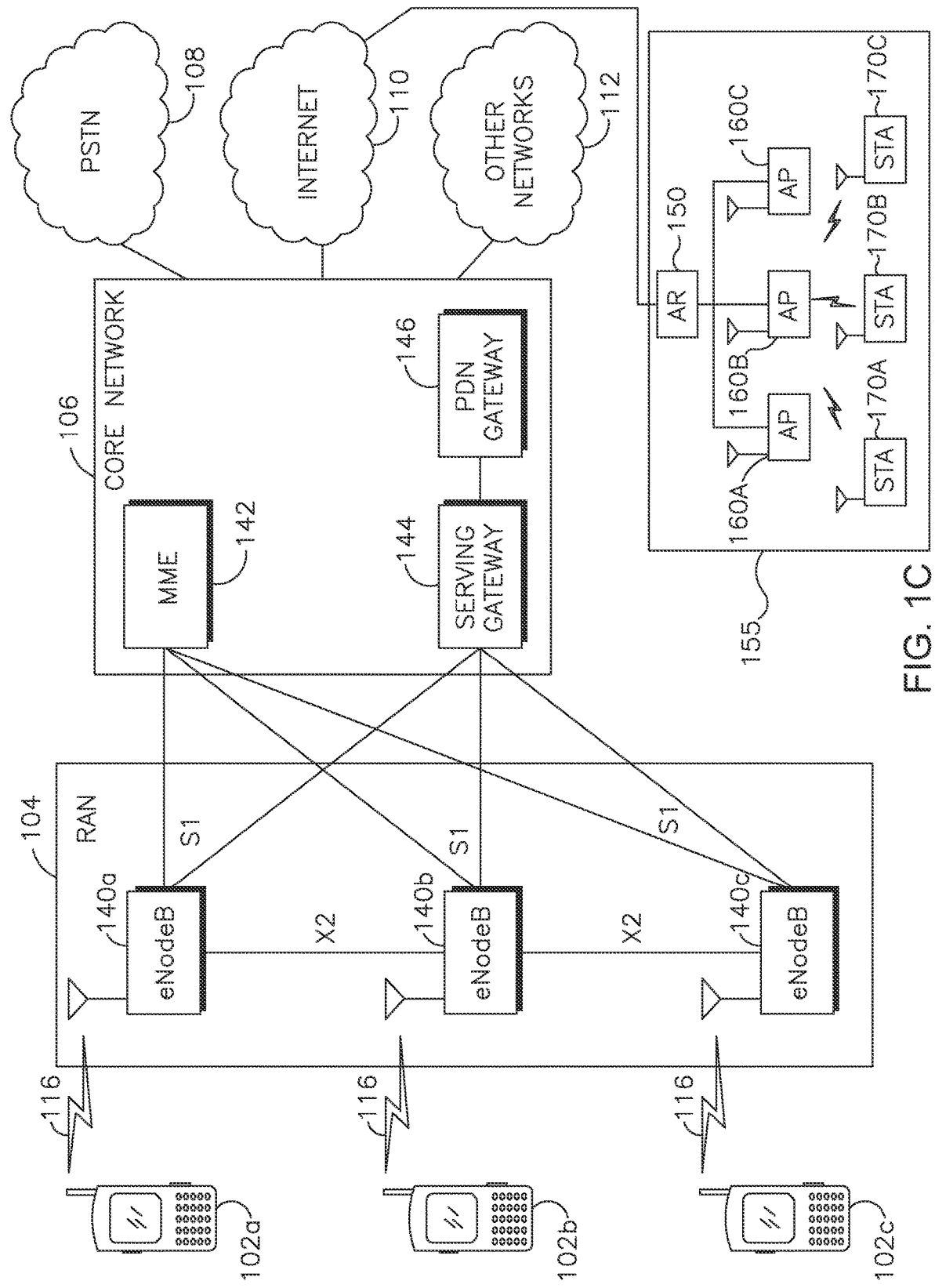
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with STAs 170a, 170b, and 170c.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
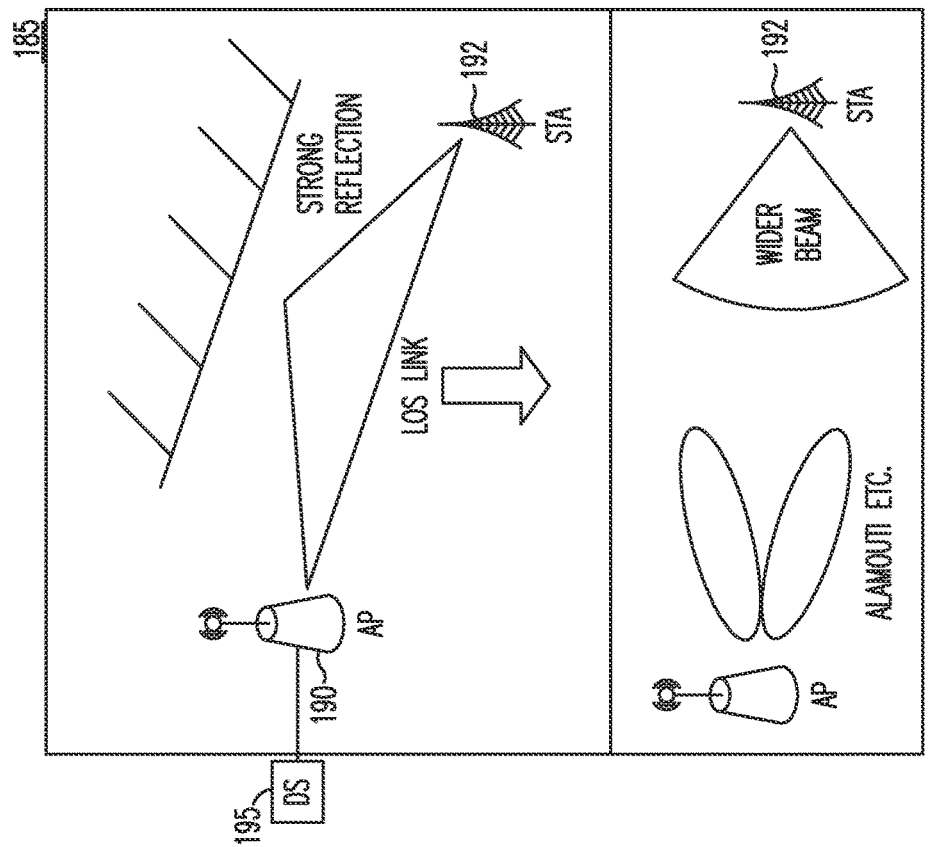
FIG. 1E is a diagram of another example WLAN with an AP and STA forming a BSS, and beamforming with multiple channels.
Figure 1D:
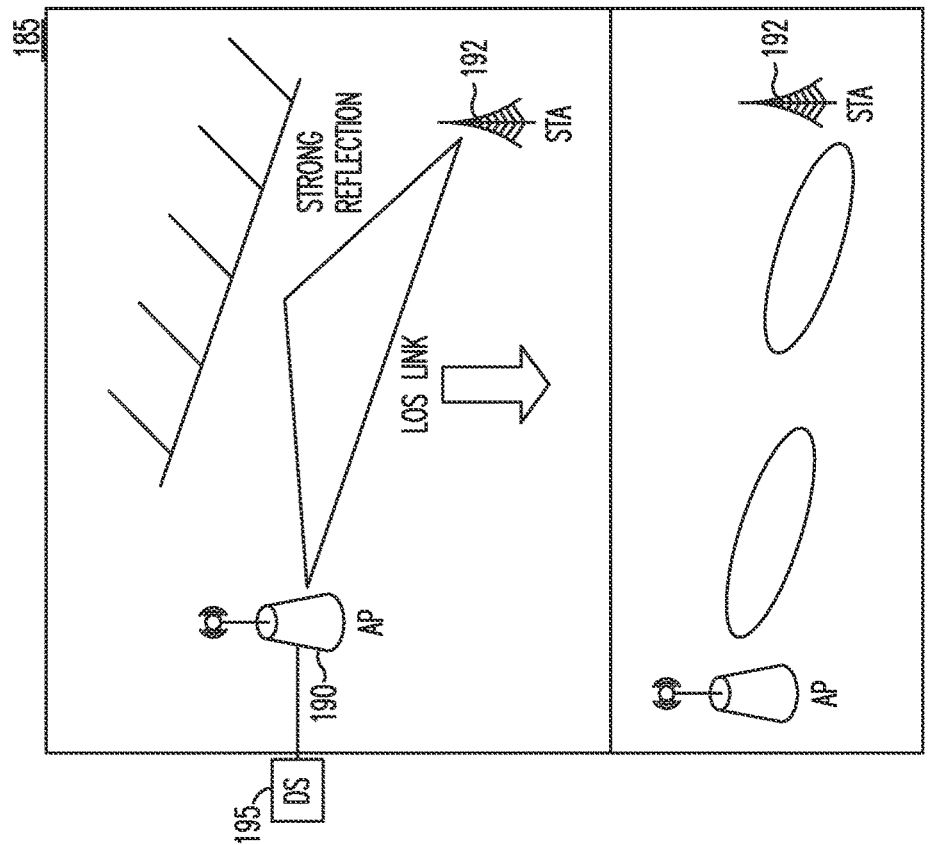
FIG. 1D is a diagram of an example WLAN with an AP and STA forming a BSS, and beamforming with multipath channels.

FIG. 1D is a diagram of an example use of beamforming in a WLAN 185. The WLAN 185 may include an AP 190 and an STA 192 forming a BSS. FIG. 1E is a diagram of an example use of beamforming using spatial diversity or multipath diversity in the WLAN 185. The WLAN 185 may include an AP 190 and an STA 192 forming a BSS. A WLAN in a Infrastructure Basic Service Set (BSS) mode has an Access Point (AP) 190 for the BSS and one or more stations (STAs) 192 associated with the AP. The AP 190 may have an access, or interface, to a Distribution System (DS) 195, or another type of wired/wireless network that carries traffic in and out of the BSS. Traffic to STAs that originates from outside the BSS may arrive through the AP to be delivered to the STAs. Traffic originating from STAs to destinations outside the BSS may be sent to the AP to be delivered to the respective destinations. Traffic between STAs within the BSS may also be sent through the AP where the source STA may send traffic to the AP and the AP may deliver the traffic to the destination STA. Such traffic between STAs within a BSS may be peer-to-peer traffic. Such peer-to-peer traffic may also be sent directly between the source and destination STAs with a direct link setup (DLS) using an 802.11e DLS or an 802.11z tunneled DLS (TDLS). A WLAN using an Independent BSS (IBSS) mode has no AP, and/or STAs, communicating directly with each other. This mode of communication may be referred to as an "ad-hoc" mode of communication.

As used herein an STA 192 may include, but is not limited to, a WTRU 102, an AP, or a communication device. Using the 802.11 infrastructure mode of operation, the AP 190 may transmit a beacon on a fixed channel, usually the primary channel. This channel may be 20 MHz wide, and may be the operating channel of the BSS. This channel may also be used by the STAs to establish a connection with the AP. The fundamental channel access mechanism in an 802.11 system may be Carrier Sense Multiple Access with Collision Avoidance (CSMA/CA). In this mode of operation, every STA, including the AP, may sense the primary channel. If the channel is detected to be busy, the STA may back off. Hence only one STA may transmit at any given time in a given BSS.

In an 802.11n example, High Throughput (HT) STAs may also use a 40 MHz wide channel for communication. This 40

MHz wide channel may be achieved by combining the primary 20 MHz channel, with an adjacent 20 MHz channel to form a 40 MHz wide contiguous channel. 802.11n may operate on the 2.4 GHz, and 5 GHz ISM bands.

In an 802.11ac example, Very High Throughput (VHT) STAs may support 20 MHz, 40 MHz, 80 MHz, and 160 MHz wide channels. The 40 MHz, and 80 MHz, channels may be formed by combining contiguous 20 MHz channels similar to 802.11n described above. A 160 MHz channel may be formed either by combining 8 contiguous 20 MHz channels, or by combining two non-contiguous 80 MHz channels, this may also be referred to as an 80+80 configuration. For the 80+80 configuration, the data, after channel encoding, is passed through a segment parser that may divide it into two streams. IFFT and time domain processing are done on each stream separately. The streams may then be mapped on two channels, and the data may be transmitted. At the receiver, this process may be reversed, and the combined data may be sent to the MAC. 802.11ac may operate only on the 5 GHz ISM band, and consequently may not be backward compatible with 802.11n modes of operation in the 2.4 GHz ISM band. For the examples described herein, any combination of channels may be used, and should not be limited to contiguous and non-contiguous channels.

Sub 1 GHz modes of operation may be supported by 802.11af, and 802.11ah. For these specifications the channel operating bandwidths may be reduced relative to those used in 802.11n, and 802.11ac. 802.11af may support 5 MHz, 10 MHz and 20 MHz bandwidths in the TV White Space (TVWS) spectrum, and 802.11ah may support 1 MHz, 2 MHz, 4 MHz, 8 MHz, and 16 MHz bandwidths using a non-TVWS spectrum. A possible use case for 802.11ah may support Meter Type Control (MTC) devices in a macro coverage area. MTC devices may have limited capabilities including only support for limited bandwidths, but also may include a requirement for a very long battery life. 802.11ah may also be used for macro coverage as support for cellular offload to WiFi.

In 802.11ad, wide bandwidth spectrum at 60 GHz may be available, thus enabling very high throughput operation. 802.11ad may support up to 2 GHz operating bandwidths and the data rate may reach up to 6 Gbps. Since the propagation loss at 60 GHz may be more significant than at the 2.4 GHz, and 5 GHz bands, beamforming may be adopted in 802.11ad as a means to extend the coverage range. To support the receiver requirements for this band, the 802.11ac MAC layer may be modified in several areas. An important modification for the 802.11ad MAC layer may include procedures that allow channel estimation and training. These procedures may include omni, and beamformed modes of operation which do not exist in 802.11ac.

WLAN systems that support multiple channels and channel widths, such as 802.11n, 802.11ac, 802.11af, and 802.11ah, may include a channel designated as the primary channel. The primary channel may, but not necessarily, have a bandwidth equal to the largest common operating bandwidth supported by all STAs in the BSS. The bandwidth of the primary channel may therefore be limited by the STA, of all the STAs operating in a BSS, which supports or enables the use of the smallest bandwidth operating mode. In the example of 802.11ah, the primary channel may be 1 MHz wide if there are STAs, for example, MTC type devices that only support a 1 MHz mode, even if the AP, and other STAs in the BSS, may support a 2 MHz, 4 MHz, 8 MHz, 16 MHz, or other channel bandwidth operating modes. All carrier sensing and NAV settings may depend on the status of the primary channel. For example, if the primary channel is busy due to a STA supporting only a 1 MHz operating mode, then the entire available frequency bands may be considered busy even though a majority of the frequency bands remain idle and available.

In the United States, for example, the available frequency bands that may be used by 802.11ah are from 902 MHz to 928 MHz. In Korea, for example, the available frequency bands may be from 917.5 MHz to 923.5 MHz, and in Japan, it may be from 916.5 MHz to 927.5 MHz. The total bandwidth available for 802.11ah may be 6 MHz to 26 MHz depending on the country.

One of the challenges for wireless communication over 60 GHz may include significant propagation loss due to the high frequency. As the wavelength decreases, the free space propagation loss may increase. To address the range limitation due to this propagation loss, 802.11ad may use beamforming to increase the Effective Radiated Power (ERP) of the transmissions. Since the wavelength is small, it may be possible to use a large antenna array to get a very high beamformed antenna gain. The beam in 802.11ad may be electronically steered to a particular STA, or group of STAs, during association with the STAs.

In order to support beamforming, the 802.11ad PHY and MAC specifications may be modified to support directional transmissions, and millimeter wave (mmW) antenna training procedures. A comprehensive beamforming training protocol may be defined in 802.11ad. The beamforming training protocol may include two components, for example a sector level sweep (SLS) procedure and a beam refinement protocol (BRP) procedure. The SLS procedure may be used for transmit beamforming training. The BRP procedure may enable receive beamforming training and iterative refinement of both the transmit and receive beams.

In order to reduce implementation complexity, 802.11ad may support beam switching at both the AP and the STA. The beam switching at both the AP and the STA may be in contrast to more advanced multi-antenna schemes, and may assume that a single RF front-end is available at both ends. Problems related to link robustness and spectral efficiency may be of importance for enabling 802.11ad+ to address the current trend for a Carrier Grade WiFi service. A Carrier Grade WiFi service may be referred to as 5 G Carrier Grade WiFi, may provide high air interference efficiency for multiple users, and a stable "cellular-like" quality. A 5 G Carrier Grade WiFi system may support robust and dynamic deployments, for example dense deployments and flash crowds.

Although 802.11ad may address the need for a very high peak throughput, limitations due to the propagation environment are not adequately addressed in 802.11ad.

For mmW communications it may be necessary to handle a propagation loss due in part to the high free space propagation loss which may occur at mmW frequencies. For example, blockage of transmissions by the human body may attenuate a signal by 15 to 25 dB for hundreds of milliseconds.

While propagation loss of walls and other indoor obstacles may prevent the propagation of mmW through them, indoor Line of Site (LOS) propagation may occur indoors. LOS propagation may occur indoors either due to a direct line of sight transmission, or due to reflections off walls and other obstacles. It should be noted that non-negligible propagation loss at mmW frequencies may occur due to walls and other environmental factors. Beam switching may be used in 802.11ad to utilize signal diversity due to these reflections.

Some mmW communications may utilize a single beam for communications, for example, in 802.11ad. MIMO techniques, such as spatial multiplexing, may be employed to improve the spectral efficiency of the system, however it may be difficult to use these techniques in mmW systems due to the need for multiple symbol generation. Methods that improve the spectral efficiency of mmW systems, such as methods that enable the use of spatial multiplexing, may be needed in future mmW specifications which for example may be based on 802.11ad, and/or in mmW systems in general.

Beamforming training protocols, such as SLS and BRP, may be used to perform transmit/receive beamforming training and iterative beam refinement training. The beamforming training overhead and latency of these procedures, however, may be significant. For example, with the transmit beamforming training defined in SLS, the transmitter may need to transmit multiple sector sweep (SSW) frames that may be modulated by different beamforming sectors. Each device may have up to 64 different beam sectors. Each SSW frame may include a full PLCP header, which may include a preamble, one or more header blocks, and a MAC frame. In order to fully exploit the beamforming gain, transmit and receive training procedures at both peer devices may be required, and an iterative beam refinement may also be needed. These procedures may represent a significant overhead and hence methods that reduce this overhead may be needed in part to allow for a better user experience in mmW systems.

Referring back to FIGS. 1D and 1E, multipath propagation may be common in indoor communications links. Beam switching based beamforming algorithms utilized in the current 802.11ad specification may attempt to point the beam to the strongest path. As shown in FIG. 1D, a LOS path and a strong reflection path may exist between AP 190 and STA 192. After the beamforming training procedure, the beam with the best channel gain may be selected. This beam may be formed towards the strongest path among multiple propagation paths. However, human blockage may introduce an average 20 dB loss for 230 ms, which may prevent the 60 GHz radio to provide multi-Gigabit/sec data transmissions. It is therefore highly likely that the beamformed link may be dropped, and hence the transmitted packet during this period would be lost. Moreover, due to the loss of the packet, the system may have to repeat the beamforming training and then retransmit the packet over a potentially new beam.

Example beamforming schemes may exploit the spatial diversity such that the transmission is not dependent on only the strongest path. As shown in FIG. 1E, with two strong propagation paths, for example, a LOS path and a strong reflection path, a number of solutions may be possible including fast beam switching, wider beam and multi-beam methods.

Spatial diversity may be achieved with fast beam switching. In order to accomplish fast beam switching when the channel condition changes, it may be necessary that both AP and STA have an available list of weight vectors/beam identifiers. Example methods for obtaining a list of weight vectors/beam identifiers are disclosed below. There may be two possibilities for fast-beam switching including in-band signaling and out-of-band signaling. In-band beam switching may be used in some examples.

In an in-band beam switching example, the AP may be communicating with the STA using a beam set (Tx and Rx beams) B1. The AP and STA may have prioritized the beam sets according to the received SNR, or SINR, during the SLS and BRP phases. The STA may monitor one or more of the received SNR, SINR, Bit-Error-Rate (BER) or Packet Error Rate (PER), acknowledgement (ACK) statistics or a combination of these parameters. If, at the end of a packet reception, the STA determines that the channel quality is deteriorating, it may append a message to the ACK packet requesting the AP to switch to the next best beam set, for example B2, for the next transmitted packet. The assumption here is that the channel condition may be deteriorating, but not to the point that the data packet cannot be decoded correctly and hence an ACK may be sent.

In another example, alternative beam retransmission methods may be used. In 802.11 systems, and mmW systems in particular, if no ACK is received, the data packet may be retransmitted. This retransmission may use the same beam that was used in the prior transmission. An example for an alternative procedure may be that if the AP does not receive an ACK, the AP may retransmit the data packet using the beam set B2 instead of the beam set B1. Since these beam sets may have been defined prior to this procedure, possibly during association of the STA with the AP, the procedure at the STA may use the corresponding receive beam set B2 for reception of the retransmission from the AP. In an example procedure, the AP and the STA may define an association of indices to beam sets, and subsequently use the beam set indices for identification of beam sets in the aforementioned procedures.

In an alternative, or additional example, the AP may cycle the data packet through the N best beam-sets. The STA may then perform a procedure wherein it receives N packets from the AP, and perform maximum-ratio-combining, selection combining, or a similar receive algorithm, on these packets. An ACK may then be determined and sent to the AP, for example, after all N transmissions have occurred, or as soon as the packet has been successfully received and decoded.

In an alternative, or additional example, the AP may also transmit the data packet through all of, or a subset of, the N beam-sets simultaneously. The remainder of the procedure described in the previous paragraph may then follow in a similar way.

A beam set may include the identification of a primary beam within the beam set. The primary beam may be used by transmission procedures at the AP, STA, or both, as the beam to be used for initial attempts at wireless communication. Alternatively, the primary beam may be used exclusively for transmission of control or scheduling information. More than one primary beam may be used for more than one STA wherein each primary beam may be associated with a particular STA.

In an alternative, or in addition to, the AP may also cycle through different modes of MIMO operation for each beam set, prior to proceeding to the next beam set. For example, if the AP does not receive an ACK on beam set B1 it may select a more robust form of operation such as Space Time Block Coding (STBC), Space Frequency Block Coding (SFBC), or Cyclic Delay Diversity (CDD), before proceeding to transmit on the remaining beam sets B2 through BN.

In some examples, a first and second best beam transmission method may be used. For example, the STA may determine the two best beams, B1, B2, using a procedure similar to the above, and recommend these beam indices to the AP. In this example, for the remainder of the communication interval, the AP and the STA may assume that either, or both, beam indices may be used for wireless communication.

The AP may then determine to transmit on either beam during a particular transmission time interval (TTI) based on one or more criteria determined by the AP. Example criteria may include one or more of the received SNR, or SINR, Bit-Error-Rate (BER), or Packet Error Rate (PER), acknowledgement (ACK) statistics, or a combination of these criteria. The STA may respond to a message from the AP with an indication of the reception quality, or similar metric, for the beam that it used to receive the message from the AP. This indication or metric may be indicated in the response by the beam index.

Alternatively, if the STA does not provide an indication of the reception quality in its ACK and/or any other packet to the AP, the AP may determine that the reception quality was acceptable for one or more associated beams. If the STA indicates a poor reception quality to the AP for B1, it may assume that the next transmission from the AP will use the second best beam B2.

During communication with the STA, the AP may store the packet reception quality for each transmission, on each beam, in a memory, while using either beam. If a particular beam in the pair becomes unusable for further communication, the AP may identify a new first, or a second best beam for communication with the STA, while at the same time continuing communication on the remaining beam of the original beam pair. Other combinations of the procedures described in this example may be possible. The above example is not limited to a pair of beams and may be extended to support any number of beams greater than one that the system may simultaneously support.

Some examples may use out of band beam switching. For example, the AP and STA may both have multi-band capability. In this example, the AP and the STA may communicate over either a 2.4 GHz or a 5 GHz link in addition to a directional 60 GHz link. The AP and the STA may use one or more of the sub-6 GHz links as an alternate link to signal to each other that the beam set needs to switch to the next best beam set at the beginning of the next data packet. This example procedure may allow for a fast beam switch to occur even if the packet currently being transmitted is not decoded correctly.

Some examples may implement spatial diversity using a single beam. For example, it may be possible that only one RF chain is available at both transmitter and receiver, such that only one data stream may be transmitted and received at the same time. This RF chain arrangement may be used in mmW systems. With one RF chain, devices may form one beam and transmit the data stream toward the direction specified by the beam. In this example, the devices may forming a beam pointing to a propagation path with the strongest channel gain. Multipath wireless channels, however, may introduce frequency selectivity. A beamforming weight may benefit some frequency tones, however, it may have a detrimental effect for one or more of the other set of frequency tones. Accordingly, there may be no guarantee that the weight pointing to the strongest propagation path will introduce the maximum beamforming gain for the entire frequency channel. Moreover, pointing in one beam direction may increase the system sensitivity to small changes in the multipath environment and may fail to provide robust communication.

Figure 2:
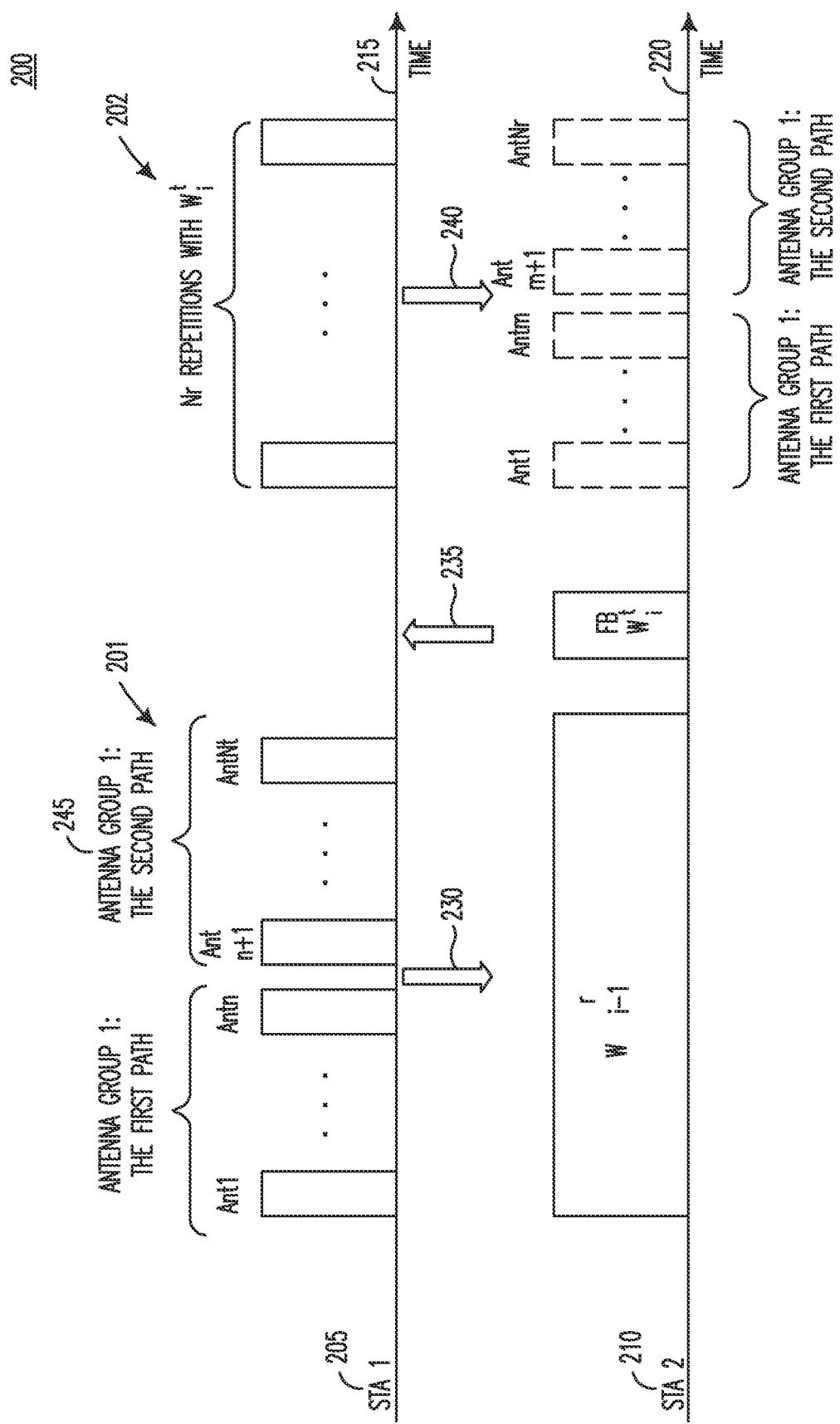
FIG. 2 is a diagram of an example of a method using two STAs to perform a multi-path beamforming method.

FIG. 2 is a diagram of an example method 200 using two STAs to perform multi-path beamforming. The method may be a multi-stage iterative beamforming method as discussed below, and may include grouping two or more antennas. For example, FIG. 2 shows a first iteration 201 of the method and a second iteration 202 of the method.

The following articles disclose methods for beamforming. P. Xia, S. K. Yong, J. Oh and C. Ngo, "A practical SDMA protocol for 60 GHz millimeter wave communications", Asilomar, 2008; and, P. Xia, S. K. Yong, J. Oh and C. Ngo, "Mulit-stage iterative antenna training for millimeter wave communications", Globecom, 2008, the entire contents of both are incorporated herein by reference.

Referring to FIG. 2, $STA_1$ 205 and $STA_2$ 210 are respectively shown on two time axes 215 and 220. In this example, $STA_1$ 205 may transmit one or more training beamforming weights, and $STA_2$ 210 may receive training beamforming weights 230, 240, and transmit beamforming weights 235 to $STA_1$ 205. $STA_1$ 205 and $STA_2$ 210 may be, for example, WTRU, stations, electronic communication devices, or access points. The example in FIG. 2 shows $STA_1$ 205 transmitting 230, 240 to only $STA_2$ 210, however there may be more than one STA, which are not shown. $STA_1$ 205 may be an AP or a non-AP STA. $STA_2$ 210 may be an AP or a non-AP STA.

In each iteration of the method 201, 202, the AP, here $STA_1$ 205, may transmit one or more training sequences over multiple time slots 230 and sweep the transmit beamforming weights. For example, $STA_1$ 205 may be an AP or a non-AP STA. Note that only two iterations of the method 201, 202 are illustrated, but the method may have more than two iterations of the method 201, 202. $STA_2$ 210 may calculate the best transmit beamforming weight vector according to an estimate of the received channel state. Note that the calculated transmit beamforming weight may not be one of the weights the transmitter $STA_1$ 205 originally utilized. The method at $STA_2$ 210 may then feedback this beamforming weight vector 235, or the estimated channel state vector, to the AP, here $STA_1$ 205. The AP, here $STA_1$ 205, may, or may not, update the transmit beamforming weight it utilizes for a subsequent transmission to $STA_2$ 210. The method may continue until packet transmissions are completed for the associated STAs, $STA_2$ 210.

The AP, here $STA_1$ 205, may group the antenna array into multiple sub-groups to point the beamforming weight to multiple paths. For example, if there are 36 antenna units and only the two strongest paths are used, then each sub-group may have 18 antenna units. Alternatively, if more antenna gain is anticipated from the strongest path, more antenna units may be assigned to the strongest path. The AP, here $STA_1$ 205, may assign other antenna sub-group partitions depending on the requirements of the system. For example, more than two strongest paths may be used. The method in this example may steer the antenna array in the first sub-group to the strongest path, while the second sub-group may be steered to the second strongest path, and so on. This antenna group partition procedure may be performed by the AP, here $STA_1$ 205, or $STA_2$ 210, or both.

In another example, antenna group based multi-path beamforming may be performed. In this example, $STA_1$ 205 may have Nt transmit antennas and $STA_2$ 210 may have Nr receive antennas, and only the two strongest paths may be considered.

The transmitter, for example $STA_1$ 205, may transmit Nt sequences 230. The Nt sequences 230 may be modulated using Nt orthogonal beamforming vectors. $STA_1$ 205 may include a precoder, for example an identity precoder, and may be configured to transmit the first sequence using the first antenna, and transmit the second sequence using the second antenna, and so on. Other orthogonal precoding matrices may be utilized by $STA_1$ 205.

The receiver, for example $STA_2$ 210, may receive the Nt sequences using the receive beamforming vector calculated in the last iteration, $W_{i-1}^r$. In some examples, $W_{i-1}^r$ may be set to an initial value. STA2 210 may be configured to determine that the first n time slots correspond to transmit antenna 1 to antenna n, which may correspond to antenna group 1. STA2 210 may utilize the training sequence transmitted in each time slot to estimate the strongest path of the propagation channel, and may denote the strongest channel path as H1. The received signal from the first n time slots may be expressed as $y_i^{11}=W_{i-1}^r(1:n)Hs+N$, where y may be the received symbol, s may be the sent symbol, N may be the additive Gaussian noise having a variance, and H may be the channel matrix between the transmitter STA1 205 and the receiver STA2 210. The receiver STA2 210 may use the correlation property of the training sequence to estimate the channel corresponding to the strongest propagation path, $\hat{H}_1^1$. Thus, the receiver STA2 210 may determine the best transmit beamforming weight corresponding to antenna group 1 and the strongest path, and may be represented as $(\hat{H}_1^1)'$. The size of the beamforming weight may be n×1.

The receiver, STA2 210, may be configured to determine that time slots n+1 to Nt correspond to transmit antenna n+1 to antenna Nt, and may correspond to antenna group 2 of STA1 205. The receiver, STA2 210, may utilize the training sequence transmitted in each time slot to estimate the second strongest path of the propagation channel, and may be denoted as H2. The received signal 245 from the Nt-(n+1)+1 time slots may be expressed as $y_i^{12}=W_{i-1}^r(n+1:Nt)Hs+N$. Since the signal may be transmitted using a sequence with a zero auto correlation (ZAC) property, STA2 210 may use a Rake receiver like method, where the strongest path may be removed, and the channel of the second strongest path may be determined. The second strongest path may be represented by $\hat{H}_2^1$. Thus the best transmit beamforming weight corresponding to antenna group 2 and the second strongest path may be $(\hat{H}_2^1)'$. The size of the transmit beamforming weight may be (Nt−n)×1.

The updated transmit beamforming weight for iteration i may be expressed as $W_i^t=[\hat{H}_1^1, \hat{H}_2^1]'$. STA2 210 may transmit $W_i^t$ back to STA1 205 at 235. STA1 205 may use the received $W_i^t$ to transmit 240 another set of beamforming training frames. STA1 205 may transmit Nr repetition of training frames, where Nr may be the number of antenna(s) at STA2 205. STA2 205 may be configured to use this set of training frames to update the received beamforming weight. STA2 210 may use Nr antennas to receive the training frames sequentially. STA2 210 may also use other orthogonal beamforming weights to receive the Nr training frames. In this example, at STA2 210, antenna 1 to m may belong to the first antenna group, and may be used to point to the strongest propagation path, while antenna m+1 to Nr may belong to antenna group 2, and may correspond to the second strongest propagation path.

In one example, STA1 205 may use a mixed mode to transmit Nr repetitions of training frames with weight $W_i^t$. This example mixed mode method is shown in FIG. 2 as 202. The received signal through the Nr time slot may be expressed as $y_i=HW_i^ts+n$. The received signal from antenna group 1 may be $y_i^{21}=y_i(1:m)$. STA2 210 may use the correlation property of the training sequence to estimate the channel with the strongest propagation path, $\hat{H}_1^2$. The received signal from antenna group 2 may be $y_i^{22}=y_i(m+1:Nr)$, and STA2 210 may use correlation detection to remove the strongest path. STA2 210 may accordingly determine the estimated channel for the second strongest path, $\hat{H}_2^2$. STA2 210 may update the receive beamforming weight, which may be represented as $W_i^r=[\hat{H}_1^2, \hat{H}_2^2]'$. In FIG. 2, the reception of the signals is shown in dashed lines as an example illustration of the receiver operation while receiving a packet.

Alternatively, or in addition to, STA1 205 may use a sequential mode. STA1 205 may transmit m repetitions of training frames with antenna group 1, i.e., $W_1^{t1}=[\hat{H}_1^1, 0]'$. During the m training time slot, the receiver, for example STA2 210, may utilize antenna group 1 to receive the training frames. For example, STA2 210 may utilize antenna 1 to receive the first training frame, and antenna m to receive the mth training frame. The received signal from these m frames may be expressed as $y_i^{21}=HW_i^{t1}s+n$. STA2 210 may estimate the channel corresponding to the strongest propagation path $\hat{H}_1^2$. STA1 205 may transmit Nr-m repetitions of training frames with antenna group 2 only, for example, $W_1^{t2}=[0, \hat{H}_2^1]'$. STA2 210 may utilize its antenna group 2 to receive the training frames. The received signal may be $y_i^{22}=HW_i^{t2}s+n$. STA2 210 may use a correlation method to determine the channel corresponding to the second strongest path, $\hat{H}_2^2$. STA2 210 may update the receive beamforming weight $W_i^r=[\hat{H}_1^2, \hat{H}_2^2]'$. In some examples, feedback channels corresponding to the strongest paths may be used directly by STA2 210 or STA1 205. Note that this mode is not illustrated in FIG. 2.

STA2 210 may send $W_i^r=[\hat{H}_1^2, \hat{H}_2^2]'$ to STA1 205 (not illustrated). In addition, the method may repeat for a number of times up to a threshold or until the method converges which may be determined by comparing a next value of the beamforming weights with a previous value of the beamforming weights and determining if the difference is less than a threshold value.

The initial beamforming weights for STA1 205 and STA2 210 may be set to initial values prior to beginning the method. STA1 205 and STA2 210 may determine the initial values in order to reduce the number iterations needed for the method to converge. The example method shown in FIG. 2 may be used for determining the two strongest paths. However, in other example embodiments, more than two paths may be determined by the STA1 205 and STA2 210.

Existing protocols may be modified to perform multi-path beamforming methods. For example, a multi-path beamforming method may be used in 802.11 and 802.11ad. For example, the multi-path beamforming method may be used in 802.11ad by using a modification of the beam refinement protocol (BRP) as disclosed in IEEE P802.11ad™/D9.0: Part 11, "Wireless LAN Medium Access Control (MAC) and Physical Layer (PHY) specifications," the entire contents of which are herein incorporated by reference. The multi-path beamforming method may be a multi-iteration multi-path beamforming training method.

A beam refinement transaction may be a set of BRP frames that include one or more beam refinement requests and responses. The multi-path beamforming method may be implemented by modifying current beamforming refinement protocols.

Figure 3:
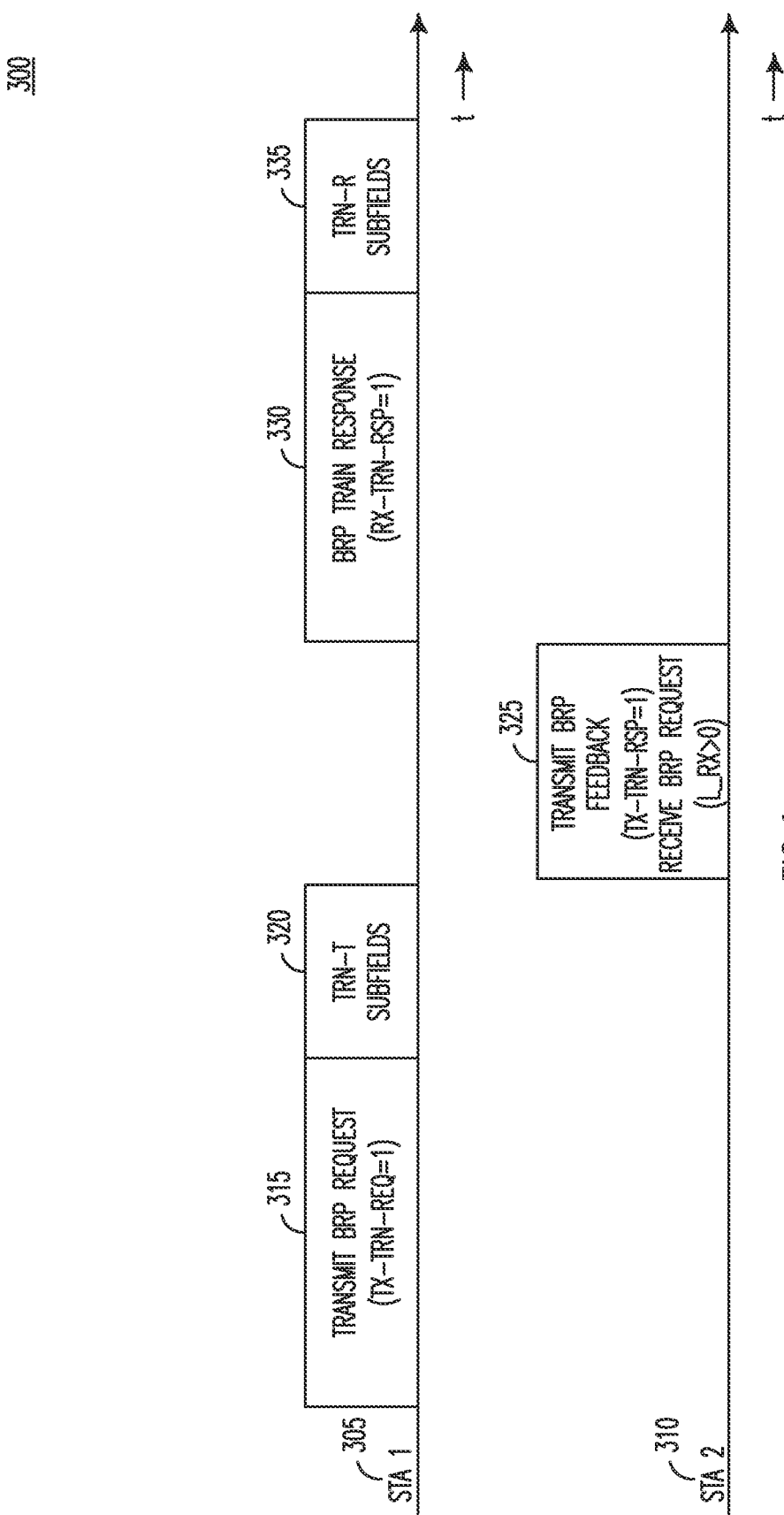
FIG. 3 is a diagram of an example of one iteration of the multi-path beamforming method using BRP transactions.

FIG. 3 is a diagram of an example of one iteration of the multi-path beamforming method 300 using BRP transactions. The beamforming initiator, STA1 305, may transmit a BRP frame 315 that indicates that the BRP frame 315 is a Transmit BRP Request frame. This indication may be performed by setting a field, for example, TX-TRN-REQ=1. A BRP frame with TX-TRN-REQ=1 315 may include a transmit training subfield (TRN-T) 320 appended to it. The responder, STA2 310 may reply with a Transmit BRP Feedback 325, for example, by setting TX-TRN-RSP=1. Moreover, STA2 310 may request a receive beamforming training by indicating Receive BRP Request frame in the same BRP frame, for example, by setting L_RX>0. In this example, the Receive BRP Request frame may be piggybacked on the Transmit BRP Response frame. L_RX may be a signal field used to indicate that the receiver requests a receive BRP training, and the transmitter may respond with a BRP train response followed by a TRN-R training field. STA1 305 may transmit a BRP frame 330 with a BRP train response, for example, by setting RX-TRN-RSP to 1. A BRP frame that includes an RX-Train-response that equals 1 may include a receive training subfield (TRN-R) 335 appended to it.

Figure 4:
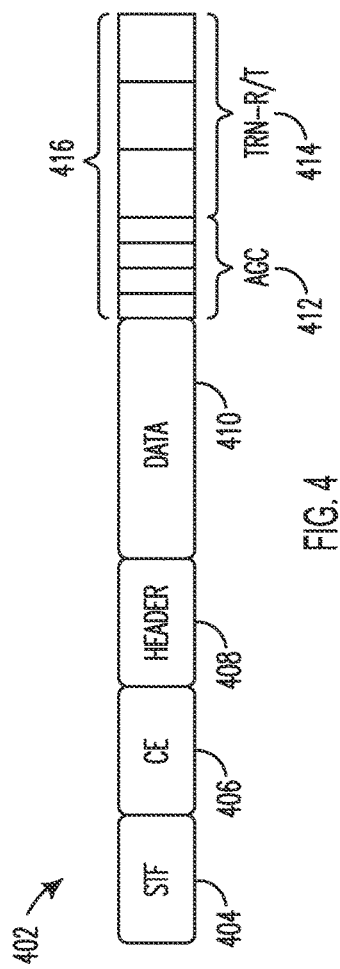
FIG. 4 is a diagram of an example frame format of a BRP packet.

FIG. 4 is a diagram of an example frame format for a BRP packet 402. The BRP packet 402 may include a short training field (STF) 404, a channel estimation (CE) field 406, a Header field 408 and a data field 410. A training field 416 may be appended/prepended to the BRP packet 402 and may include an AGC training field 412 and a receiver/transmitter training subfield (TRN-R/T) 414. A BRP packet 402 may be transmitted using control PHY. Prior to the RTN-R/T training, there may be a signaling exchange to aid the training procedure. This is the purpose of field 404, 406, 408, 410. A Packet Type field may be included in the PHY header, and it may indicate whether a TRN-R or a TRN-T subfield 414 is appended to the frame 402. A BRP frame 402 with a TRN-R/T 414 field appended may be referred to as a BRP-RX/TX packet 402. In a BRP-TX packet 402, the transmitter may change the TX beamforming weight configuration at the beginning of each AGC subfield 412. The set of beamforming weights used for the AGC subfields 412 may be the same as that used for the TRN-T subfield 414. In a BRP-RX packet 402, the transmitter may use the same transmit beamforming weight as in the preamble and data fields of the transmission data packet. The BRP frame may be an Action No ACK frame.

Figure 5:
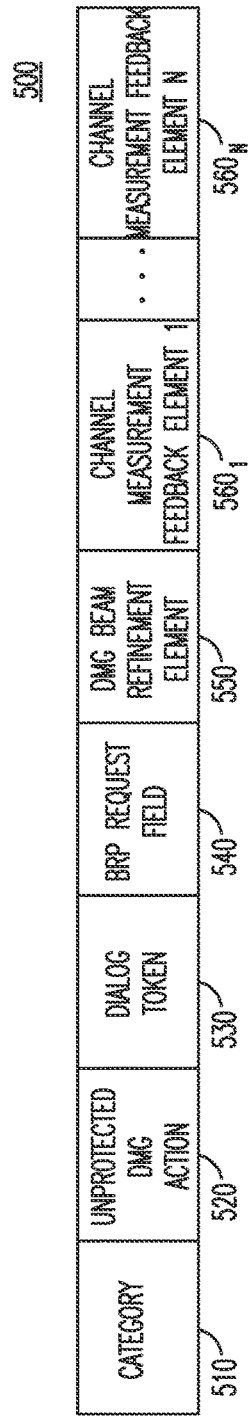
FIG. 5 is a diagram of an example format of a BRP frame Action field.

FIG. 5 is a diagram of an example format of a BRP frame Action field. The BRP frame Action field 500 may include a Category field 510, an Unprotected DMG Action field 520, a Dialog Token field 530, a BRP Request field 540, a DMG Beam Refinement element 550, and one or more Channel Measurement Feedback elements 5601 ... 560n.

An 802.11ad beam refinement protocol may be modified as follows in order to accommodate a multi-path beamforming algorithm. For example, an initiator may determine the capabilities of the responder prior to initiating beamforming training with the responder. The multi-path multi-stage iterative beamforming training capability may be indicated in a DMG Capabilities element. A DMG Capabilities element may be present in Association Request, Association Response, Reassociation Request, Reassociation Response, Probe Request and Probe Response frames and may be present in DMG Beacon and Information request and response frames. A DMG Antenna Array Support field may include one or more bits that indicate that the STA is capable of forming sub-antenna groups and capable of performing the multi-path multi-stage beamforming training method.

Partitioning of antenna sub-groups at both initiator and responder may be signaled. Depending on the antenna grouping method, the signaling may be different. For example, the antenna grouping may be performed uniformly or non-uniformly.

In a uniform antenna grouping example, assuming the total number of antennas is even, each antenna sub-group may have the same number of antenna elements, and hence only the number of antenna groups is required to indicate the partition of antenna sub-groups. For example if there are four antennas, and two groups, the number of groups, in this example two, may be sent back since the number of antennas per group will be known. The mapping between antenna element indices and sub-group indices may be predetermined and transmitted explicitly in a field of the BRP frame, for example, a BRP Request field. If the mapping is explicitly indicated in the BRP frame, the antenna sub-group index may be assigned to each antenna element.

In a non-uniform antenna grouping example, each antenna sub-group may have a different number of antenna elements. For example, the system may assign more antenna elements for the strongest path, so that the antenna gain from this sub-group may be larger. The mapping between antenna element indices and sub-group indices may be predetermined and transmitted explicitly in a field of the BRP frame, for example, in a BRP Request field.

Mapping between antenna sub-groups and channel propagation paths/taps may be predetermined. For example, antenna sub-group 1 may always map to the strongest path, and so on. Alternatively, the mapping may be defined in the BRP Request field.

The precoding matrix used by the initiator, for example, STA1 205, in the first part of each iteration may be predetermined and agreed by both initiator and responder. The first part of each iteration may be referred to as the transmit beamforming training part. In one example, a set of unitary precoding matrices may be predetermined. In this example, the initiator and responder may negotiate which matrix is utilized before performing the beamforming training. For example, the precoding matrix index may be predetermined and transmitted in the BRP Request field.

The number of antennas at both initiator and responder side may be signaled. Number of antennas may be signaled, for example, in the PHY header, MAC header or BRP Request field.

Figure 6:
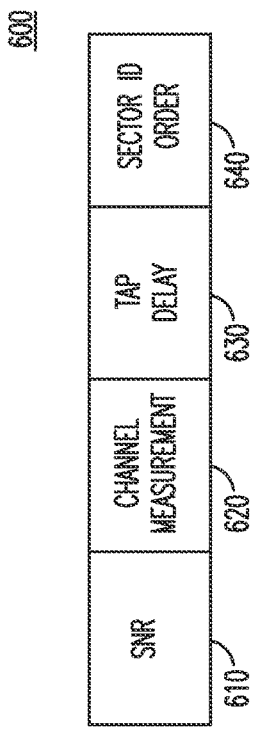
FIG. 6 is a diagram of an example modified channel measurement feedback element.

FIG. 6 is a diagram of an example modified channel measurement feedback element 600. The channel measurement feedback element may include a signal-to-noise ratio (SNR) subfield 610, a channel measurement subfield 620, a tap delay subfield 630, and a sector ID order subfield 640. The presence of these subfields may depend on the values defined in the DMG Beam Refinement element. For example, the channel measurement subfield may be used to feed back up to Ntap channel measurements that correspond to a common set of relative tap delays defined in the tap delay subfield. Without the presence of the tap delay subfield, for example, the Ntaps channel taps may be interpreted as contiguous time samples, separated by Tc, where Tc may be the SC PHY chip time, and may be 0.57 ns. In these exemplary multi-path beamforming methods, the channel measurements of the strongest propagation paths may be sent to STA1. In the example shown in FIG. 2, the strongest path/tap may be assigned for the first antenna sub-group, and the second strongest path/tap may be assigned for the second antenna sub-group and so on. If the multi-path beamforming method is indicated in the PHY header, MAC header or MAC body, the interpretation of the channel measurement may be modified when the tap delay subfield is not present. Therefore, protocols may be modified to accommodate examples of the multi-path beamforming method disclosed herein.

Weighted multi-path beamforming training methods may be performed. For example, a beamforming method for steering the beam towards multiple propagation paths may be performed. The strongest propagation paths/taps may be determined by a STA, and one or more beamforming weights may be determined to point to one or more of the propagation paths/taps. The beamforming weight for the kth strongest propagation path may be represented as $W_k$, and the final beamforming weight may be expressed as $$W = \sum_{k=1}^{K} \alpha_k W_k,$$

where K may be the number of channel propagation paths and $\alpha_k$ may be the weight, with $\Sigma\alpha_k=1$.

Different methods may be used by the STA selecting $\alpha_k$ in one of the following ways. For example, propagation path selection may be based on:

$$\alpha_k = \begin{cases} 1 & k = m \\ 0 & k \neq m \end{cases}.$$

By this selection, the final beamforming weight vector may equal the weight vector directed towards the mth propagation path.

In an 802.11ad example, the channel propagation taps may be measured and fed back to the beamforming initiator, which may be STA1 205. According to the channel measurement of each tap, a channel gain may be estimated by the STA. Channel gain of the kth propagation path/tap may be represented as $\beta_k$. $\alpha_k$ may be represented as $$\alpha_k = \lambda - \frac{1}{\beta_k},$$

so that $\Sigma\alpha_k=1$, $$\lambda = \frac{1 + \sum 1/\beta_k}{K}$$

may be satisfied. The propagation path with the larger channel gain may have a larger weight and may be determined by the STA to be the strongest propagation path.

A single data stream transmission may be performed with multi-beam capability devices. For example, multiple RF chains may be available at the AP. Accordingly, the AP may form multiple beams simultaneously. In this example, the STA may form only one RF chain. The AP and the STA may be configured to use an N×1 virtual MIMO channel. The AP and the STA may be configured to use diversity methods, such as, for example, STBC, SFBC and CDD. These example methods may be performed by more than one AP and more than one STA. In addition, a STA may be an AP.

There may be at least two possible transmission procedures that implement RF front-end beamforming with digital domain STBC. One example transmission procedure may use full size beamforming with STBC. Another example transmission procedure may use partial size beamforming with STBC.

Figure 7:
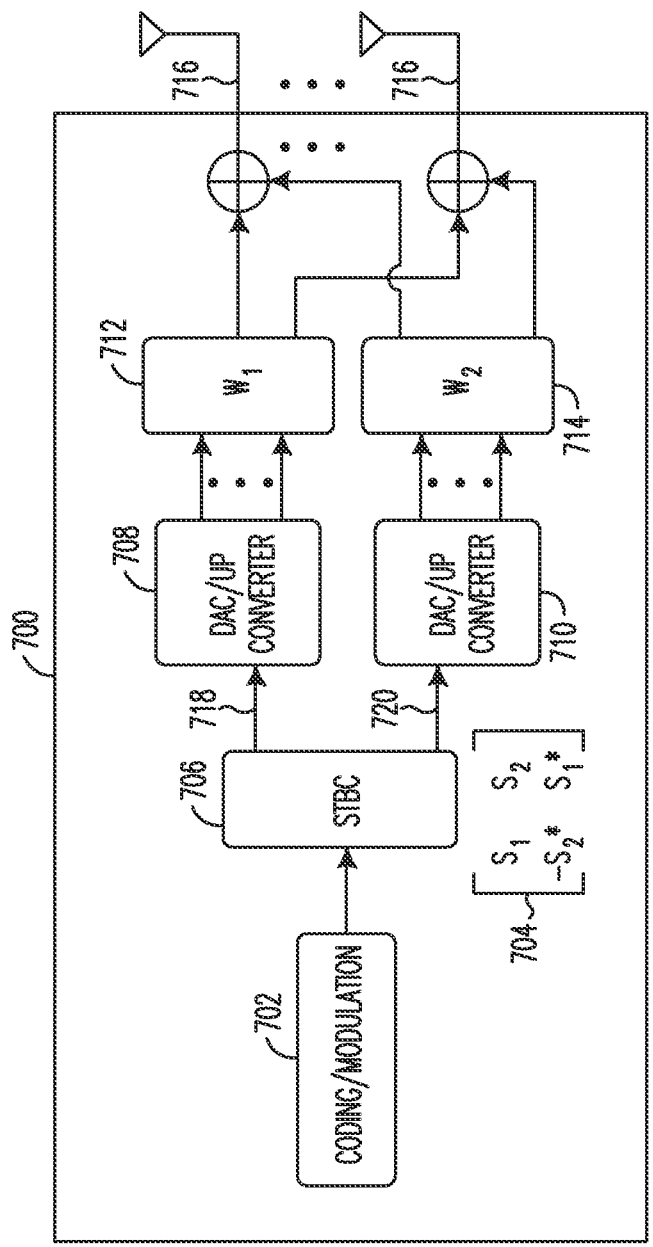
FIG. 7 is a diagram of an example AP configured to perform a transmission using full size beamforming with STBC.

FIG. 7 is a diagram of an example AP 700 configured to perform a transmission using full size beamforming with STBC. The AP 700 may include a coding/modulation unit 702, an STBC encoder 706, a plurality of DAC/upconverters 708, 710, and a plurality of antennas 716. In this example, the coding/modulation unit 702 may perform modulation and coding and pass the modulation symbols 704 to the STBC encoder 706. The STBC encoder 706 may generate two data streams 718, 720. The two data streams 718, 720 then be processed through two RF chains at the plurality of DAC/upconverters 708, 710, which may separately perform DAC and up conversion to the operating frequency band. At the RF front-end, two beamforming weight vectors W1 712 and W2 714 may be generated by AP. Each weight-vector may be of size Nt×1. The first data stream 718 may be multiplied with the first weight vector W1 712, and the second data stream 720 may be multiplied with the second weight vector W2 514. The two data streams 718, 720 may then be summed together and transmitted through the Nt antennas 716. In some embodiments, the AP may be configured with more than two RF chains.

Figure 8:
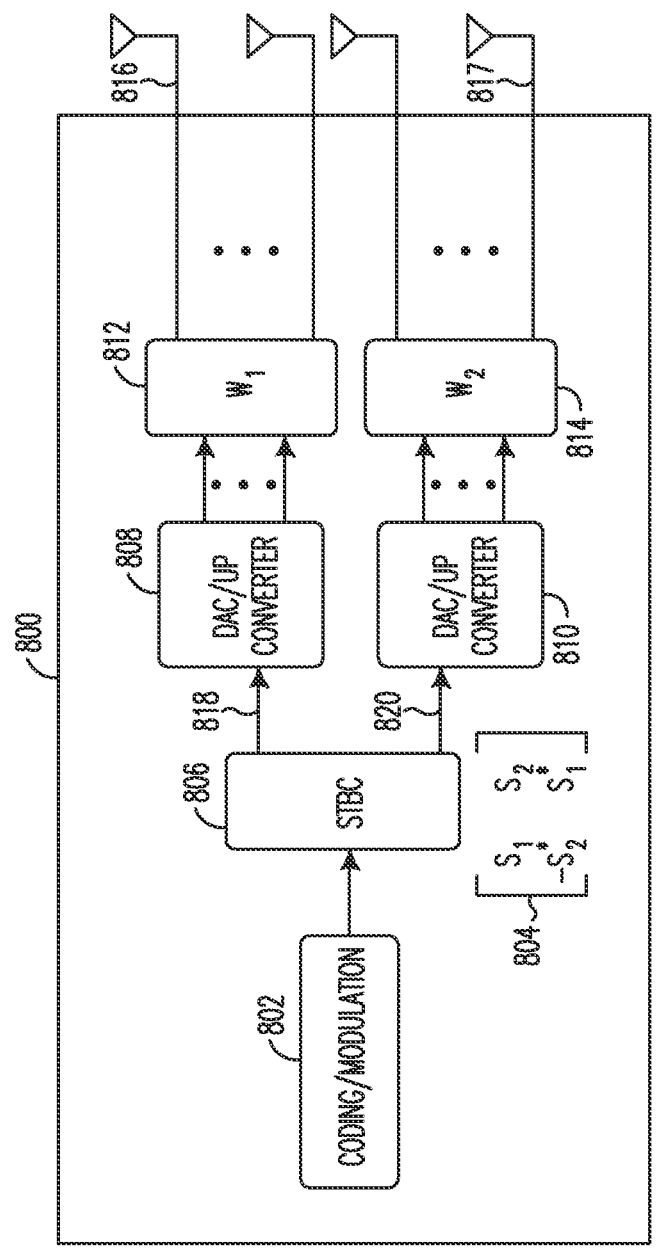
FIG. 8 is a diagram of an example AP configured to perform a transmission using partial size beamforming with STBC.

FIG. 8 is a diagram of an example AP 800 configured to perform a transmission using partial size beamforming with STBC. The AP 800 may include a coding/modulation unit 802, an STBC encoder 806, a plurality of DAC/upconverters 808, 810, and a plurality of sets of antennas 816, 817. In this example, the coding/modulation unit 802 may perform modulation and coding and pass the modulation symbols 804 to the STBC encoder 806. The STBC encoder 806 may generate two data streams 818, 820. The two data streams 818, 820 may then be processed through two RF chains at the plurality of DAC/upconverters 808, 810, which may separately perform DAC and up conversion to the operating frequency band. At the RF front-end, two beamforming weight vectors W1 812 and W2 814 may be generated. Each weight vector may be of size Nt/2×1. The first data stream 818 may be multiplied with the first weight vector W1 812, and the second data stream 820 may be multiplied with the second weight vector W2 814. The first data stream 818 may be transmitted through the first set of Nt/2 antennas 816 and the second data stream may be transmitted through the second set of Nt/2 antennas 817. In embodiments, AP may be configured with more than two RF chains.

The AP and/or the STA may be configured to send and receive multiple data streams. For example, the AP and/or the STA may be configured with multiple RF chains. In these examples, the AP may be configured to communicate with multiple STAs simultaneously. The AP may be configured to distinguish the multiple STAs by spatial domain beams, thus the method may be referred to as Beam Division Multiple Access (BDMA). The AP may need multiple RF chains to perform BDMA. For example, the AP may be configured to use spatial multiplexing methods for single STA transmission. The AP and STA may be configured to send more than one data stream at a time, which may increase the spectral efficiency of the system. Multiple RF chains may be needed at both AP and STA side.

Figure 9:
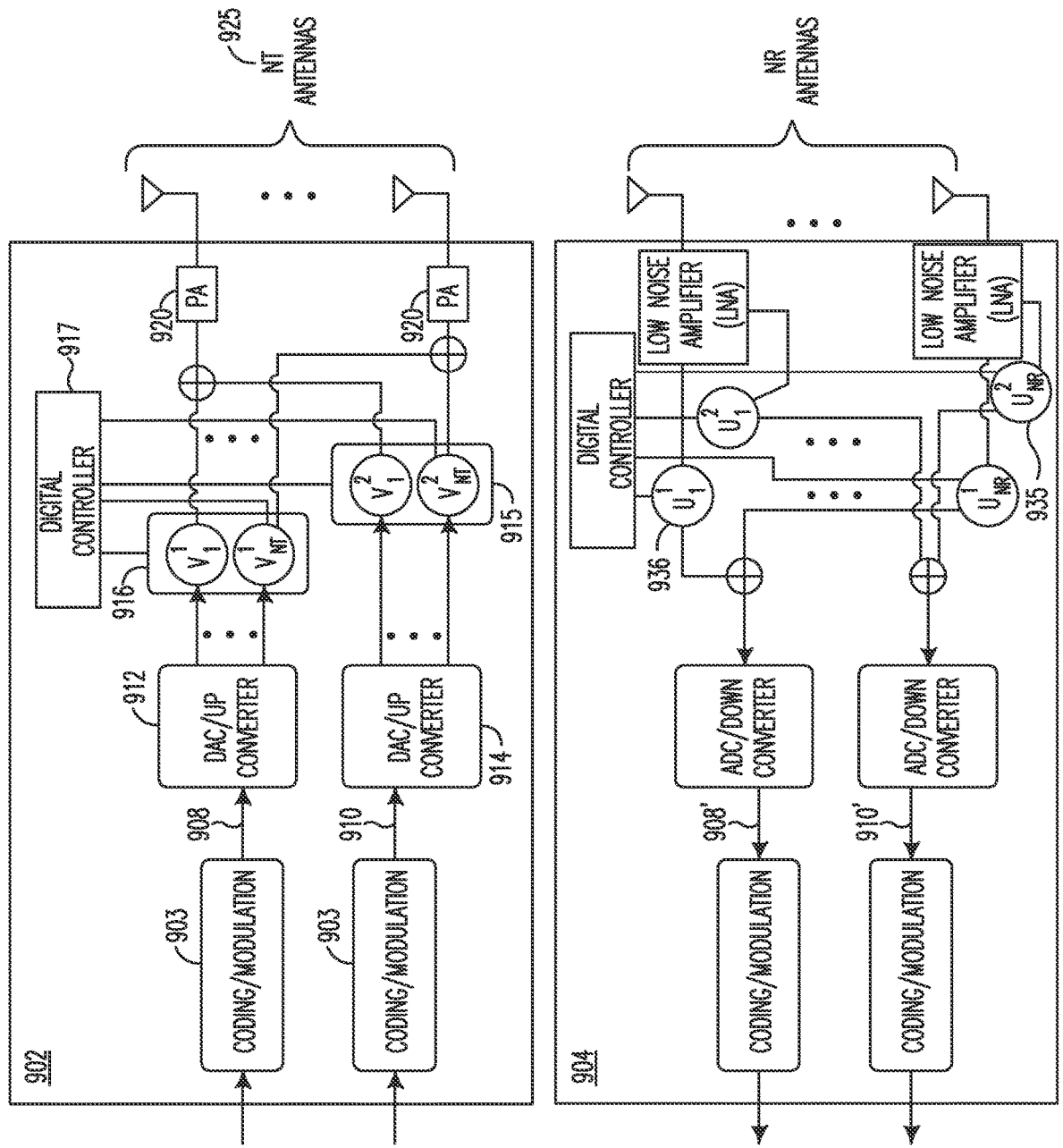
FIG. 9 is a diagram of an example transceiver architecture.

FIG. 9 is a diagram of an example of transceiver architecture 900. The AP and/or STA may be configured as follows. The transceiver architecture 900 may include a transmitter side 902 and a receiver side 904. The transmitter side 902 may include one or more coding/modulation units 903, a plurality of DAC/upconverters 912, 914, a digital controller 917, one or more power amplifiers (PA)s 920, and a plurality of Nt antennas 925. Multiple data streams may be modulated and coded at baseband, and then converted from a digital domain to an analog domain through the digital controller 917. The streams 908, 910 may be upconverted to operation frequency band by the DAC/upconverters 912, 914. Two sets of DACs and upconverters are illustrated here, which implies that up to two data streams may be supported by the transmitter. Beamforming weights 915, 916 may be applied prior to applying the streams to the PAs 920. The beamforming weights 915, 916 may be prepared in a digital domain.

The transmitter 902, may be an AP or STA, an may be configured with Nt antennas 925. The Nt antennas 925 may be shared by two or more RF chains. When the transmitter 902 has two data streams $\{s_1, s_2\}$ to transmit, it may generate two beamforming weights $V^1=(V_1^1, V_2^1, \ldots, V_{Nt}^1)^T$ 916 and $V^2=(V_1^2, V_2^2, \ldots, V_{Nt}^2)^T$ 915. The two signal streams may be combined and transmitted through Nt transmit antennas 925, $s=V^1s_1+V^2s_2$. The AP and STA may be similarly configured on the receiver side if multiple RF chains are presented. The receiver 904 may generate two sets of receive beamforming weights $U^1=(U_1^1, U_2^1, \ldots, U_{Nr}^1)^T$ 936 and $U^2=(U_1^2, U_2^2, \ldots, U_{Nr}^2)^T$ 935 and apply them in an analog domain. The weighted streams may be applied to a respective ADC/downconverter. The downconverted streams 908', 910' may be decoded and demodulated.

Communication devices, which may be, for example, APs or STAs, with the transceiver embodiment illustrated in FIG. 9 may be referred to as Type I. In some embodiments, the AP and/or STA may be configured with more than two RF chains where FIG. 9 may be extended to accommodate the more than two RF chains.

Figure 10:
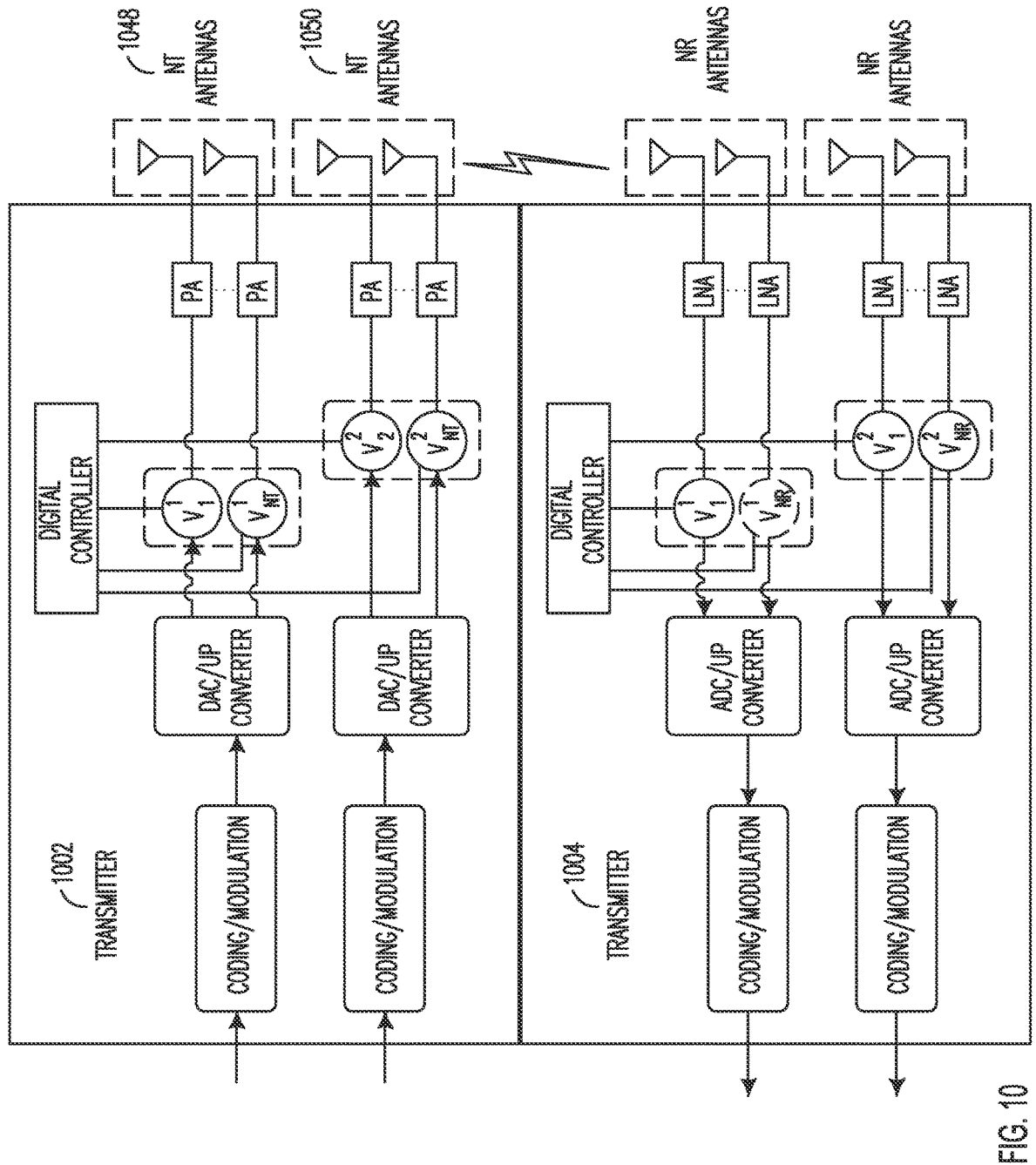
FIG. 10 is a diagram of another example transceiver architecture.

FIG. 10 is a diagram of another example transceiver architecture 1000. The transceiver architecture 1000 may include a transmitter side 1002 and a receiver side 1004. In this example, the AP and or the STA may be configured as follows. Each RF chain may have its own set of antennas 1048, 1050, respectively. The antennas may be deemed to have been partitioned or split into sub-groups based on the number of RF chains. Compared to Type I devices, in order to achieve the same antenna gain, N antenna elements may be required. Here N may be the number of RF chains. Communication devices, which may be, for example, APs or STA, with the transceiver architecture illustrated in FIG. 10 may be referred to as Type II. The beamforming weights in FIG. 10, may be tuned as a group by the digital controller logic, as indicated by the dashed lines.

Figure 11:
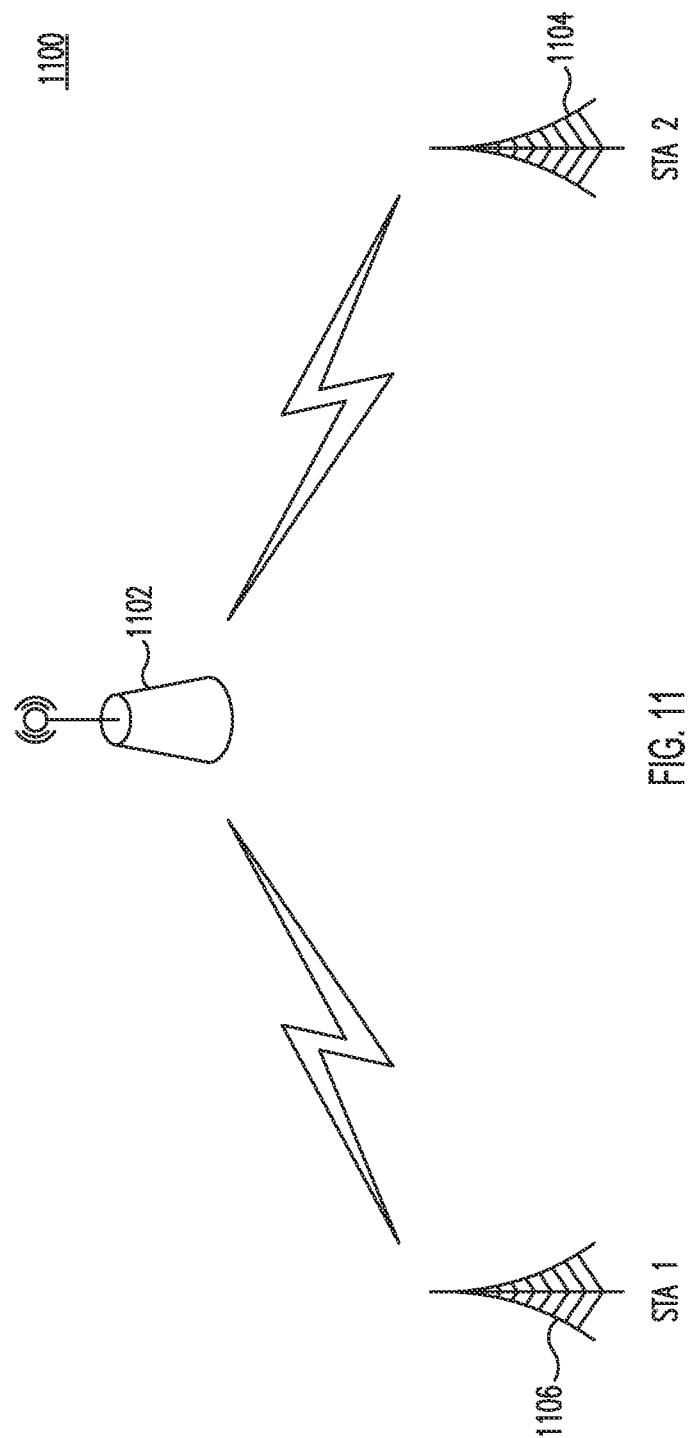
FIG. 11 is a diagram of an example beam division multiple access (BDMA) architecture.

FIG. 11 is a diagram of an example of beam division multiple access (BDMA) architecture 1100. The AP 1102 may be configured to transmit two packets to STA1 1106 and STA2 1104 simultaneously. The STAs 1106, 1104 may be configured to share the time-frequency resource by different RF front-end beams.

The AP 1102 may be configured to prepare MAC packets for both STA1 1106 and STA2 1104. The AP 1102 may encode and modulate the MAC packets and form separate PHY packets and up convert them to 60 GHz through separate RF chains. At the RF front-end, the AP 1102 may apply beamforming weight vector W1 to the first data stream and W2 to the second data stream. The AP transmits a combination of the two data streams. In this way, multiple RF chains may share the same set of antennas as shown in FIG. 9. Alternatively, the AP 1102 may be configured to implementation BDMA by dividing, grouping, or partitioning the set of antennas to sub-groups, and each RF chain control may be sent by the AP 1102 on one antenna sub-group as shown in FIG. 10.

The AP and STA may be configured to perform a beamforming training method for BDMA. The AP and/or STA may be configured to perform the beamforming training method sequentially with one or more STAs in communication with one another. The example beamforming training methods may be standardized, for example, and may be used in 802.11ad. The AP and/or STA may be configured to use orthogonality between training beams.

Figure 12:
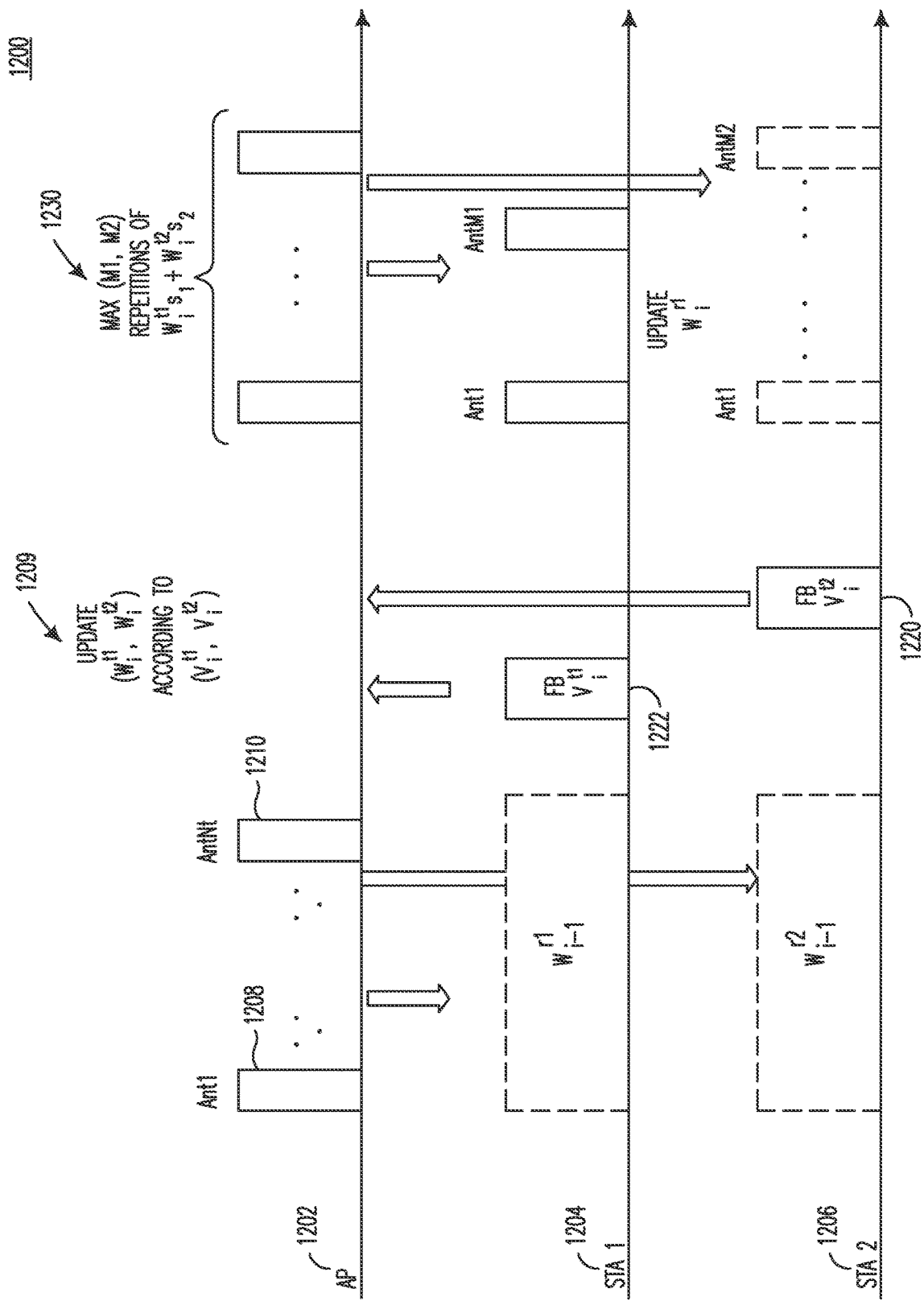
FIG. 12 is a diagram of an example beamforming training method for BDMA.

FIG. 12 is a diagram of an example beamforming training method 1200 for BDMA. This example may use a multi-stage iterative beamforming training algorithm for BDMA. In the example illustrated, the AP 1202 has Nt antennas, STA1 1204 has M1 antennas and STA2 1206 has M2 antennas.

The beamforming training method for BDMA may be performed iteratively. The AP 1202 may transmit Nt sequences 1208. The Nt sequences 1208 maybe modulated using Nt orthogonal beamforming vectors. The example shown in FIG. 12 may be performed using a precoder, for example, an identity precoder. In this example, the first sequence may be transmitted using a first antenna ("Ant 1") 1208, and a second sequence may be transmitted using the second antenna, and so on until the Nt antenna ("Ant Nt") 1210. The AP 1202 may be configured to use other orthogonal precoding matrices, such as, for example, the Walsh Hadamard matrix or FFT matrix.

STA1 1204 may be configured to utilize the best receive beamforming vector 1212 calculated through the last iteration, $W_{i-1}^{r1}$, to receive the signals. In FIG. 12, the reception of the signals is shown in dashed lines as an example illustration of the receiver operation while receiving a packet. For example, the dashed box $W_{i-1}^{r1}$ may indicate that the STA1 1204 should use receive beamforming vector $W_{i-1}^{r1}$ to perform receive beamforming. Since the AP 1202 may have transmitted the signal through each antenna sequentially, STA1 1204 may receive a Nt×1 effective MISO channel between AP 1202 and STA1 1204, $W_{i-1}^{r1}H_1$ at the end of the transmission due to the use of the receive beamformer. Equivalently, the received signal may be expressed in a matrix format: $y_{11}=W_{i-1}^{r1}H_1s+n$, where y may be the received signal, s may be the sent signal, n may be Gaussian noise, W may be the weight used by STA1 1204, and H may be the channel matrix between AP 1202 and STA1 1204. Based on the received signal, STA1 1204 may calculate or determine the best transmit beamforming weight from AP 1202 to STA1 1204 which may be represented as $$V_i^{r1} = \frac{y_{11}s'}{\|y_{11}s'\|}.$$

Similarly, STA2 1206 may be configured to utilize $W_{i-1}^{r2}$ to receive the signals, and the received signal may be expressed as $y_{12}=W_{i-1}^{r2}H_2s+n$. The best transmit beamforming weight from AP 1202 to STA2 1206 may be represented as $$V_i^{r2} = \frac{y_{12}s'}{\|y_{12}s'\|},$$

which STA2 1206 may be configured to determine.

The method may continue with STA1 1204 sending $V_i^{r1}$ 1222 to the AP 1202. STA2 1206 may send $V_i^{r2}$ 1220 to the AP 1202. STA2 1206 may transmit the packet immediately after the transmission of STA1 1204, or STA2 1206 may wait for a polling frame transmitted from the AP 1202 (not illustrated) before transmitting the packet.

The method may continue with the AP 1202 calculating MU-MIMO weight $W_i^{t1}$ and $W_i^{t2}$ based on $V_i^{r1}$ and $V_i^{r2}$. The AP 1202 may then implement a linear or non-linear MU-MIMO precoding algorithm for this weight update 1209.

The method may continue with the AP 1202 transmitting 1230 again with the best beamforming weights and each STA 1204, 1206 receiving with multiple receive antennas.

The method may continue with one of the following alternatives. In a first alternative, as illustrated in FIG. 12, the AP 1202 may transmit $W_i^{t1}s_1+W_i^{t2}s_2$ for Max(M1, M2) times 1230. $s_1$ and $s_2$ may be orthogonal sequences, and may be known at AP 1202, STA1 1204 and STA2 1206. The AP 1202 may signal STA1 1204 and STA2 1206 about the assignment of $s_1$ and $s_2$. STA1 1204 may be configured to switch receive antennas to train the best receive beamforming weight $W_i^{r1}$. Similarly, STA2 1206 may train the best receive beamforming weight $W_i^{r2}$. STA1 1204 may use the orthogonal sequences to estimate the current signal (via cross correlation with $s_1$) and the current interference (via cross correlation with $s_2$). Thus, STA1 1204 may train its receive beamforming vectors by nulling the interference. Similarly, STA2 1206 may use the orthogonal sequences to estimate the current signal (via cross correlation with $s_2$) and the current interference (via cross correlation with $s_1$). Then, STA2 1206 may train its receive beamforming vectors by nulling the interference.

In a second alternative, the AP 1202 may transmit $W_i^{t1}s$ for M1 repetitions. STA1 1204 may switch between its M1 antennas to receive $W_i^{t1}s$, and at the same time, STA2 may monitor the transmission of $W_i^{t1}s$. AP 1202 may transmit $W_i^{t2}s$ for M2 repetitions and STA2 may switch between its M2 antennas to receive $W_i^{t2}s$ while STA1 1204 monitors the transmission of $W_i^{t2}s$.

The example beamforming training method for BDMA may not be successful. If the correlation between two STAs 1204, 1206 is high, the two STAs 1204, 1206 may not be distinguished by beams. This may lead to an unsuccessful beamforming training for BDMA. In this example, the AP 1202, and or STAs 1204, 1206, may be configured to provide information if BDMA may or may not be supported with the current configuration. The STAs 1204, 1206 may include the report of beamforming gain when they report $V_i^{r1}$ and $V_i^{r2}$ to the AP 1002. The beamforming gain may be defined as $\|y_{11}s'\|^2$ and $\|y_{12}s'\|^2$. Alternatively, or in addition, the STAs 1204, 1206 may report signal to interference ratio (SIR) during or at the end of the method. The STAs 1004, 1006 may determine or calculate the desired signal strength and interference signal strength with both example alternatives.

The BDMA training method may include performing BDMA training on each STA 1204, 1206 sequentially. This example method may be extended for more than two STAs.

Examples of the BDMA training method may be standardized. For example, the BDMA training method may be used with IEEE 802.11ad. In these examples, a service period (SP) may be a time period scheduled for service from one device to another device. The transmission during an SP duration may be scheduled by an AP. The BDMA training method may be scheduled by the AP if it is allocated in an SP duration. Examples of the BDMA training method may be used by modifying the BRP procedures.

Figure 13:
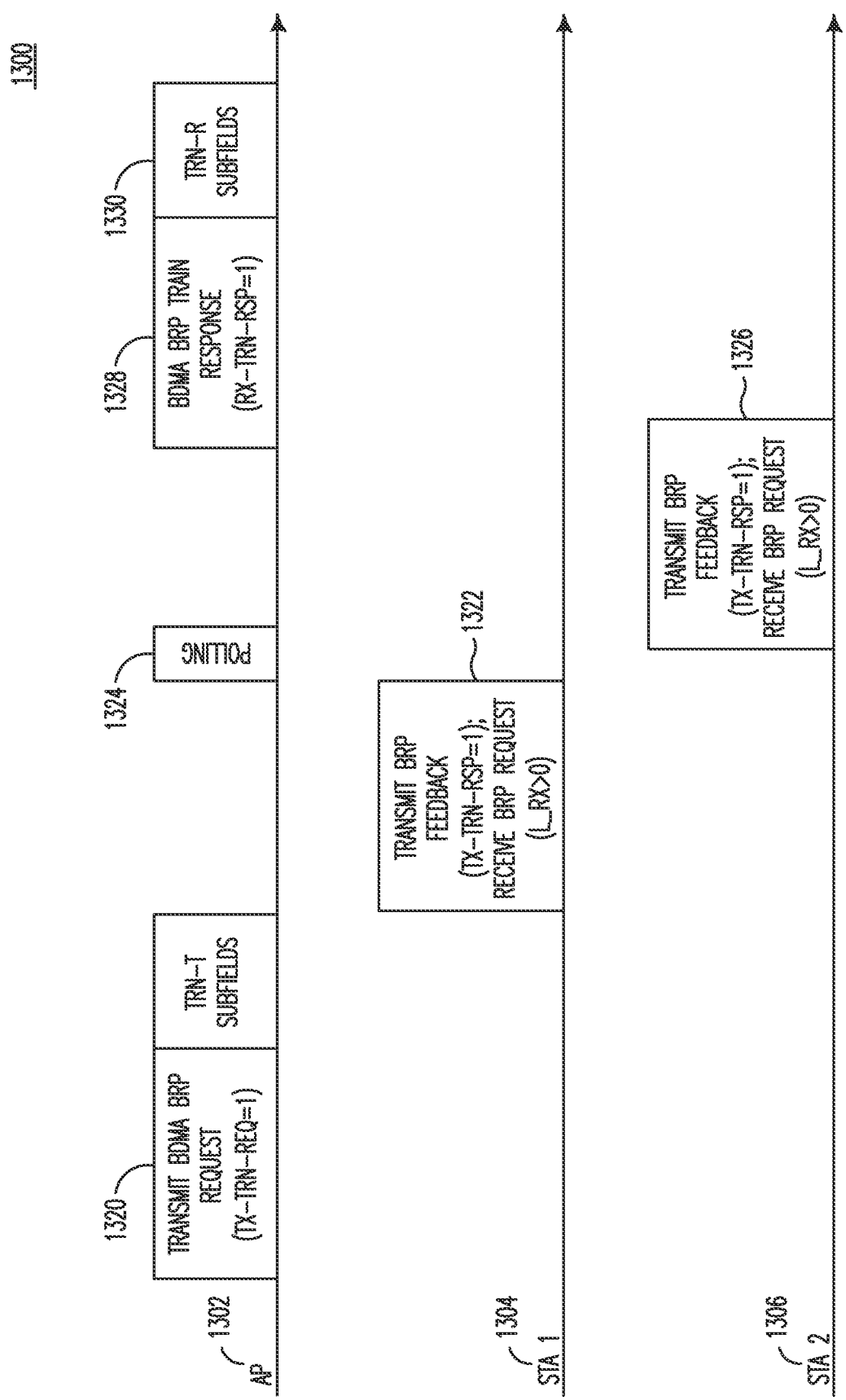
FIG. 13 is a diagram of an example modified BRP procedure to implement a multi-stage iterative beamforming training method for BDMA.

FIG. 13 is a diagram of an example modified BRP procedure to implement a multi-stage iterative beamforming training method for BDMA 1300. In this example, AP 1302 may transmit a BRP frame 1320 that indicates a Transmit BDMA BRP Request. A Transmit BDMA BRP Request subfield may be defined in BRP Request field, and may indicate that the BRP frame is for transmit BDMA BRP training. Alternatively, a Transmit BRP Request may be used with TX-TRN-REQ=1 to indicate that the BRP frame is for transmit BRP training. A frame that is utilized for single user beamforming training or BDMA training may be indicated implicitly or explicitly in the MAC frame or PHY header.

STA1 1304 may reply with a Transmit BRP Feedback frame 1322 by setting TX-train-response=1. STA1 1304 may also request a receive beamforming training by indicating Receive BRP Request in the same Transmit BRP Feedback frame 1322 by setting L_RX>0.

AP 1302 may transmit a Polling frame 1324 to STA2 1304 to request BRP feedback. This step may be skipped if the frame length of BRP feedback frame is fixed and known by all the devices.

STA2 1306 may reply with a Transmit BRP Feedback frame 1326 by setting TX-train-response=1. STA2 1306 may also request a receive beamforming training by indicating Receive BRP Request in the same Transmit BRP Feedback frame 1326 by setting L_RX>0.

AP 1302 may transmit a BDMA BRP frame 1328 indicating a BRP train response by setting RX-Train-response to 1. A BRP frame with RX-Train-response equal to 1 may include a receive training subfield TRN-R 1330 appended to it. A BDMA BRP frame 1328 may indicate multiple receivers explicitly or implicitly in PHY header or MAC body.

The example in FIG. 13 shows that one AP 1302 may transmit to two STAs 1304, 1306. However, the BDMA transmission may be from one device to two devices irrespective of whether they are APs or STAs. Moreover, the AP 1302 may transmit to two or more STAs.

Examples of the method in FIG. 13 may include BDMA protection mechanisms. The feedback frame 1322 may include not only the best beam, but also the achievable SINR. If after a certain number of iterations, the achievable SINR is less than the target SNR, the BDMA method may be aborted. The number of iterations may be predetermined, determined statically, dynamically determined based on previous methods running, or in another way.

BDMA grouping may be indicated in some examples. The following examples may enable an indication of BDMA grouping by one or more communication devices. Using an SP, the BDMA grouping information may be indicated in an allocation field in an Extended Schedule Element. The Extended Schedule Element may be transmitted in a Beacon frame. The tuple, Source AID, Destination AID and Allocation ID may uniquely identify the allocation. The Source AID field may be set to the AID of the STA an may initiate channel access during the SP. The Destination AID field may indicate the AID of a STA that may be expected to communicate with the source STA during the allocation. The Allocation ID may identify an airtime allocation from a Source AID to a Destination AID. With BDMA transmission, more than one receiver may be indicated. One method may be to group BDMA transmitters and receivers, and assign each group a unique BDMA ID. Each STA corresponding to a BDMA ID may be assigned a User Position Array that may be used to distinguish the role of the STA. Therefore, the Destination AID may be replaced by the BDMA ID for BDMA transmissions. Alternatively, more than one Destination AID may be included in the allocation field. In this way, the order of the Destination AIDs may imply the role of one or more STAs in the BDMA transmission.

Since the BDMA transmission may be within the SP time slot, the communication device may not need to signal the BDMA transmission in the PHY header or MAC header. The MCS levels and Length field for each BDMA receiver may be signaled in PHY Header.

Figure 14:
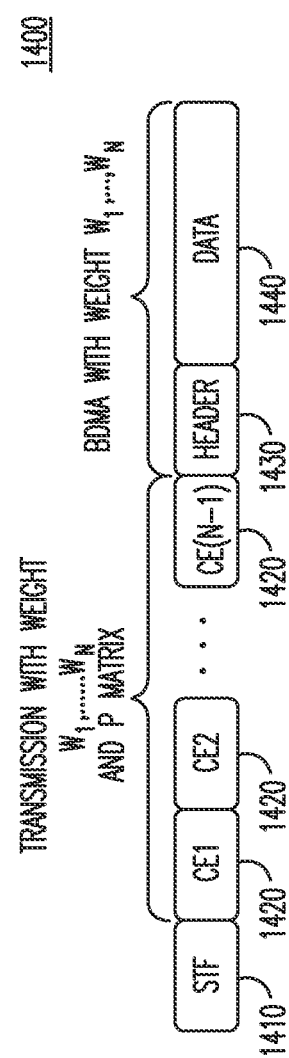
FIG. 14 is a diagram of an example PHY layer frame format.

FIG. 14 is a diagram of an example PHY layer frame format 1400 that may be used in a BDMA transmission. N may represent the number of BDMA communication devices that may be signaled in the allocation field in Extended Schedule Element. The example PHY layer frame format 1400 may include an STF field 1410, one or more CE fields 1420, a header 1430, and a data field 1440. The one or more CE fields 1420 may be transmitted with a weight and a P matrix. The weight for the one or more CE fields may range from W1 to WN, for example, the first field may be transmitted with a weight W1, and the last CE field may be transmitted with a weight WN. The header 1430 and data field 1440 may be transmitted using BDMA and with all of the weights from W1 to WN.

Example embodiments may include performing BDMA in a contention based access period. For example, BDMA transmission protocols may be used by the communication device. Performing a BDMA transmission in a contention based access period may utilize the NDP announcement (NDPA) and NDP sequences for beamforming training. BDMA transmission may be performed after the NDP sequence exchanges. Alternatively, or in addition, the BDMA transmission may be delayed until the BDMA initiator, which may be a STA or an AP, acquires the media again.

In one example BDMA transmission procedure, one or more of the communication devices may be configured to use an NDPA period. In this example, an AP may transmit a message that indicates which STAs should participate in BDMA training. The NDPA frame may contain a STA info field to indicate the individual STA information. The NDPA frame may reserve a TXOP until the end of BDMA beamforming training by setting the duration period accordingly. Alternatively, the NDPA frame may reserve a TXOP until the end of the BDMA transmission.

In another example, an NDP period may be configured to allow training of transmit antennas at the AP. In this example, the STAs may perform measurements. In another example, a feedback period may be configured to allow STAs to take turns to feedback the best beam vectors as well as the achievable SINRs. Moreover, STAs may also feedback the measured channels or the calculated transmit beamforming weight vectors.

In another example, a receiver training period may be configured to allow an AP to set its beamforming vectors. In this example, STAs may train their receive antennas.

In another example, the NDP period, feedback period, and receiver training period may be repeated for a number of iterations. A number of stopping criteria may be applied in this example. For example, if the achievable SINR meets expectation, the iteration may stop early. In these examples, BDMA transmissions may begin a certain inter-frame spacing after training is performed. ACK1 and ACK 2 may each be followed by a SIFs duration after BDMA transmission is performed.

In another example, one or more communication devices may be configured to indicate BDMA grouping. The following is an example of indicating grouping. BDMA grouping with contention based access period (CBAP) may be performed by using a BDMA ID. A BDMA ID management frame may be transmitted from an AP to a STA to indicate whether the STA belongs to one of the BDMA groups and the user position of the STA. The BDMA ID management frame may contain a Membership Status Array field and a User Position Array field. The BDMA ID may be included in BDMA related frames, such as BDMA training frames, BDMA transmission frames, or other similar frames.

One or more communication devices may be configured to perform a BDMA transmission method for CBAP that may be similar to that defined for SP. The BDMA transmission may be performed after the BDMA initiator, for example the AP, acquires a TXOP in the CBAP. The PHY layer frame format may be the same as illustrated FIG. 14. The transmission of BDMA in CBAP may not be scheduled by the AP. Accordingly, the BDMA ID may be included in the PHY header. The number of users or communication devices, N, may be indicated in the sequence exchange to acquire the TXOP before a BDMA transmission. Alternatively, it may be implicitly indicated using a short training field (STF) and/or a channel estimation (CE) field.

In some examples, the communication devices may be configured to perform single user spatial multiplexing. In order to perform spatial multiplexing, both transmitter and receiver may have multiple RF chains. FIG. 9 and FIG. 10 are example transceiver configurations to perform single user spatial multiplexing. A communication device with the transceiver configuration shown in FIG. 9 may be referred to as a Type I device, i.e., where multiple RF chains share the same set of antenna elements. A communication device with the transceiver configuration shown in FIG. 10 may be referred to as a Type II communication device, i.e., where the antenna elements may be split into sub-groups, and each sub-group may correspond to one RF chain.

The communication devices may be configured to perform beamforming methods for spatial multiplexing. In this example, several beamforming methods may be used to perform spatial multiplexing transmission between a pair of communication devices. Two types of example beamforming methods may be used. The first example method may be referred to as Eigen-Beamforming based spatial multiplexing. In this example, the initiator/responder may estimate the channel over the air and calculate beamforming weights accordingly. The second example method may be referred to as beam sweep based spatial multiplexing. With this method, both initiator and responder may transmit and receive using pre-defined beam sectors. The beamforming beams may then be selected from these beam sectors.

The communication devices may be configured to perform an Eigen-Beamforming based spatial multiplexing method, where the communication devices may be configured as Type I devices with calibration. Type I devices may have multiple RF chains sharing the same set of antennas as discussed in conjunction with FIG. 9. If the communication devices are configured to calibrate the multiple transmit RF chains, the communication devices may determine that the multiple RF chains are identical. Examples of non-calibrated or identical RF chains are discussed below.

Figure 15:
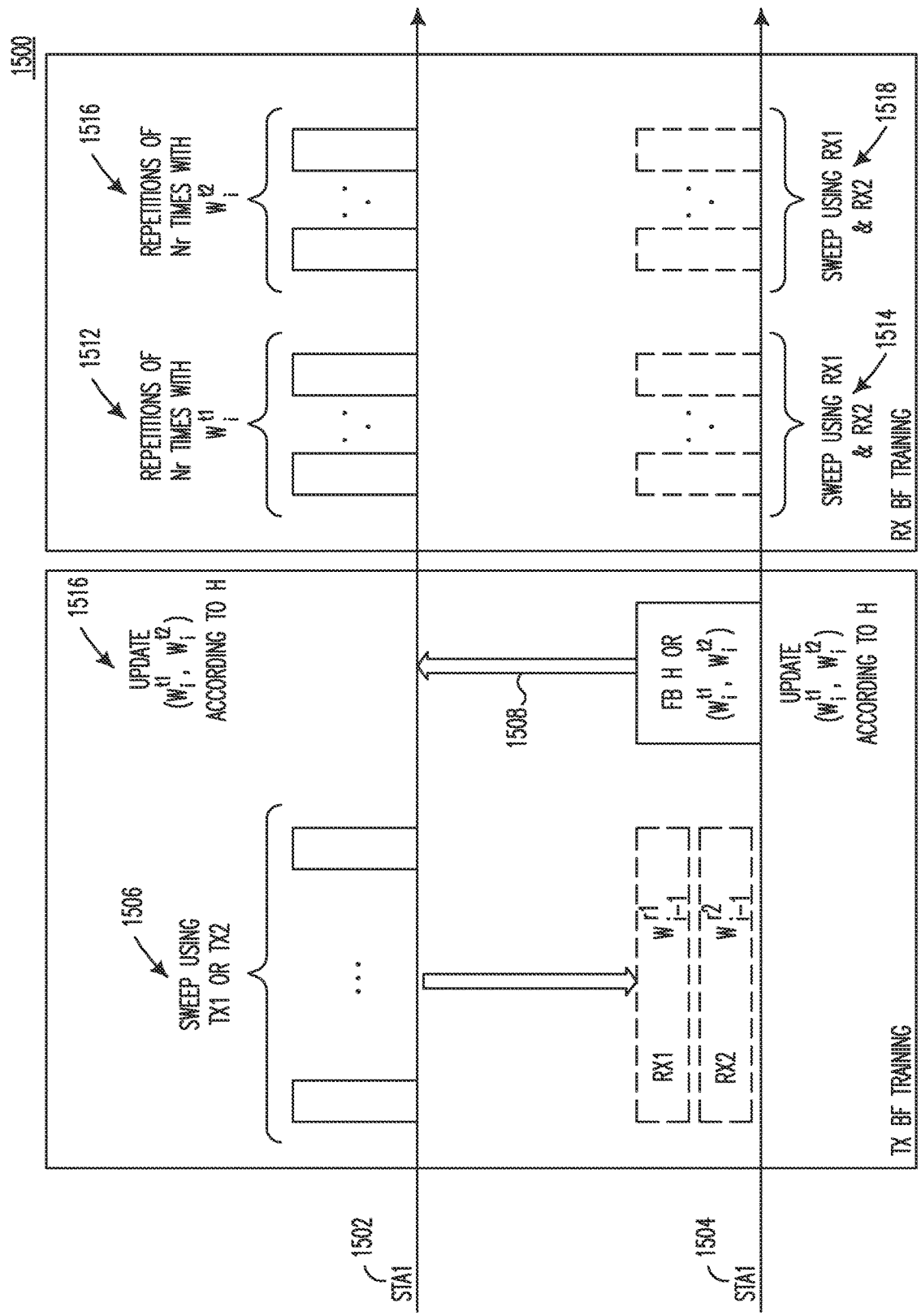
FIG. 15 is a diagram of an example beamforming training procedure using Eigen-beamforming based spatial multiplexing where the communication devices may be configured to calibrate multiple transmit RF chains.

FIG. 15 is a diagram of an example beamforming training procedure 1500 using Eigen-beamforming based spatial multiplexing where the Type I communication devices may be configured to calibrate the multiple transmit RF chains. An iterative example with two RF chains at both initiator and responder is shown in FIG. 15, however, the method may be extended to any number of RF chains. In this example, the transmitter (STA1) 1502 may have Nt antenna elements, and the receiver side (STA2) 1504 may have Nr antenna elements.

The beamforming training method may be performed iteratively. In each iteration, the transmit beamforming training may be performed and then the receive beamforming training may be performed. An example of a detailed method for Type I devices with calibration is described below.

For iteration i, STA1 1502 may act as an initiator, and may transmit Nt training sequences 1506 sweeping all the transmit antenna elements. The transmission may be performed using the first transmit RF chain (TX1) or the second transmit RF chain (TX2) of STA1 1502. In some examples, the two RF chains may be identical or differ by a scalar, or, in other examples, the two TX chains may be calibrated.

Alternatively, STA1 1502 may also use an orthogonal precoding matrix to transmit the Nt training sequences.

STA2 (responder) 1504 may have two receive beamforming weights trained from previous iterations, and may be represented by $W_{i-1}^{r1}$ and $W_{i-1}^{r2}$. If this is the first iteration of the method, STA2 1504 may randomly select two beamforming weights, or use Omni weights, or may determine the two beamforming weights in an alternate method. The first RF chain (RX1) may receive a signal that is the weighted combination of signals received from all the receive antenna elements. This weight may be the first receive beamforming weight $W_{i-1}^{r1}$. Similarly, the second RF chain (RX2) may receive a signal that is the weighted combination of signals received from all the receive antenna elements. This weight may be the second receive beamforming weight $W_{i-1}^{r2}$. In FIG. 15, the reception of the signals is shown in dashed lines as an example illustration of the receiver operation while receiving a packet. For example, the dashed box $W_{i-1}^{r1}$ may indicate that the STA1 1504 should use receive beamforming vector $W_{i-1}^{r1}$ to perform receive beamforming. After conversion to the digital domain, STA2 1504 may estimate the effective channel by comparing the received sequence with the known transmitted sequence. For time slot k, STA2 1504 may estimate two channels using two RF chains $$\begin{bmatrix} G_{k1} \\ G_{k2} \end{bmatrix}.$$

With Nt time slots, STA2 1504 may receive $$\begin{bmatrix} G_{11} & \dots & G_{Nt1} \\ G_{12} & \dots & G_{Nt2} \end{bmatrix}.$$

Applying the inverse of the orthogonal precoding matrix, STA2 1504 may obtain the channel from Nt transmit antenna elements to two RF chains as $$H = \begin{bmatrix} H_{11} & \dots & H_{Nt1} \\ H_{12} & \dots & H_{Nt2} \end{bmatrix}.$$

STA2 1504 may feedback the channel information or beamforming weights for multiple data streams to STA1 1502. STA2 1504 may calculate the transmit beamforming weights for spatial multiplexing and feedback 1508 the weights to STA1 1502. STA2 1504 may feedback the channel H to STA1 1502, and STA1 1502 then may determine or calculate the transmit beamforming weights 1510.

In some examples, the transmit beamforming weight method may be implementation dependent. For example, STA1 1502 and/or STA2 1504 may use linear or non-linear procoding algorithms.

The updated transmit beamforming weights for the ith iteration may be denoted as $(W_i^{t1}, W_i^{t2})$. STA1 1502 may transmit a training sequence Nr times with beamforming weight $W_i^{t1}$ 1512. STA2 1504 may sweep through Nr receive antennas 1514, or apply an orthogonal matrix. STA2 1504 then passes the received signal through the two RF chains. STA1 1502 may transmit training sequences again Nr times with beamforming weight $W_i^{t2}$ 1516. STA2 1504 may repeat a similar procedure with both RF chains 1518. The sweeping of the Nr receive antennas 1514 and 1518 is shown in dashed lines as an example illustration of receiver operation. For example, to receive Nr packets from the transmitter, the receiver may receive a first packet with the first receive antenna, a second packet with the second receive antenna, and so on, until it receives a last packet with the last receive antenna. STA2 1504 may estimate the channel and update the receive beamforming weight accordingly (not shown). The receive beamforming weight method may be implementation dependent.

The above method may be repeated until the method converges or certain criteria have been met that indicate that spatial multiplexing is not suitable for the pair of devices, for example, a set of failure criteria). There may be several ways to define failure criteria that indicate that the pair of devices are not suitable for spatial multiplexing. A first example of failure criteria may be that STA2 monitors the rank or condition number of a channel matrix while selecting a beamforming weight, and may feedback this information to STA1. A second example of failure criteria may be that STA2 monitors the rank or condition number of channel matrix while sweeping through Nr receive antennas or applying an orthogonal matrix, and feeds back this information to STA1. If the rank is less than the number of data streams expected to be supported, or the condition number is greater than a certain threshold, both STA1 and STA2 may determine that the maximum number of data streams supported may not meet the desired number. In this example, the pair of devices may determine to complete the training procedure, and perform RF selection at both transmitter and receiver later. For example, the pair of devices may terminate the training with a full set of RF chains, and return to perform beamforming training with a lesser number of RF chains. For example, after training, the devices may transmit with a lesser number of spatial streams.

A method of Eigen-beamforming for spatial multiplexing may be performed. The method may be for communication devices that are of Type I or Type II as discussed in conjunction with FIG. 9.

Type I devices may perform transmit RF chain training sequentially if the RF chains are not calibrated. Even though the RF chains share the same set of antenna elements and the physical channels over the air may be the same, the effective channels, which may be the combination of channel over the air and transmit/receive RF chains, may be measured and estimated.

Type II devices may split the antenna elements into sub-groups, and each sub-group has an RF chain. In these examples, there may be two RF chains and two sub-groups of antennas. The physical channel corresponding to RF chain 1 may be transmitted with antenna sub-group I, which may be different from that corresponding to RF chain 2 that may be transmitted with the other antenna sub-group. Because of this, the training for multiple transmit RF chains may be performed sequentially.

Figure 16:
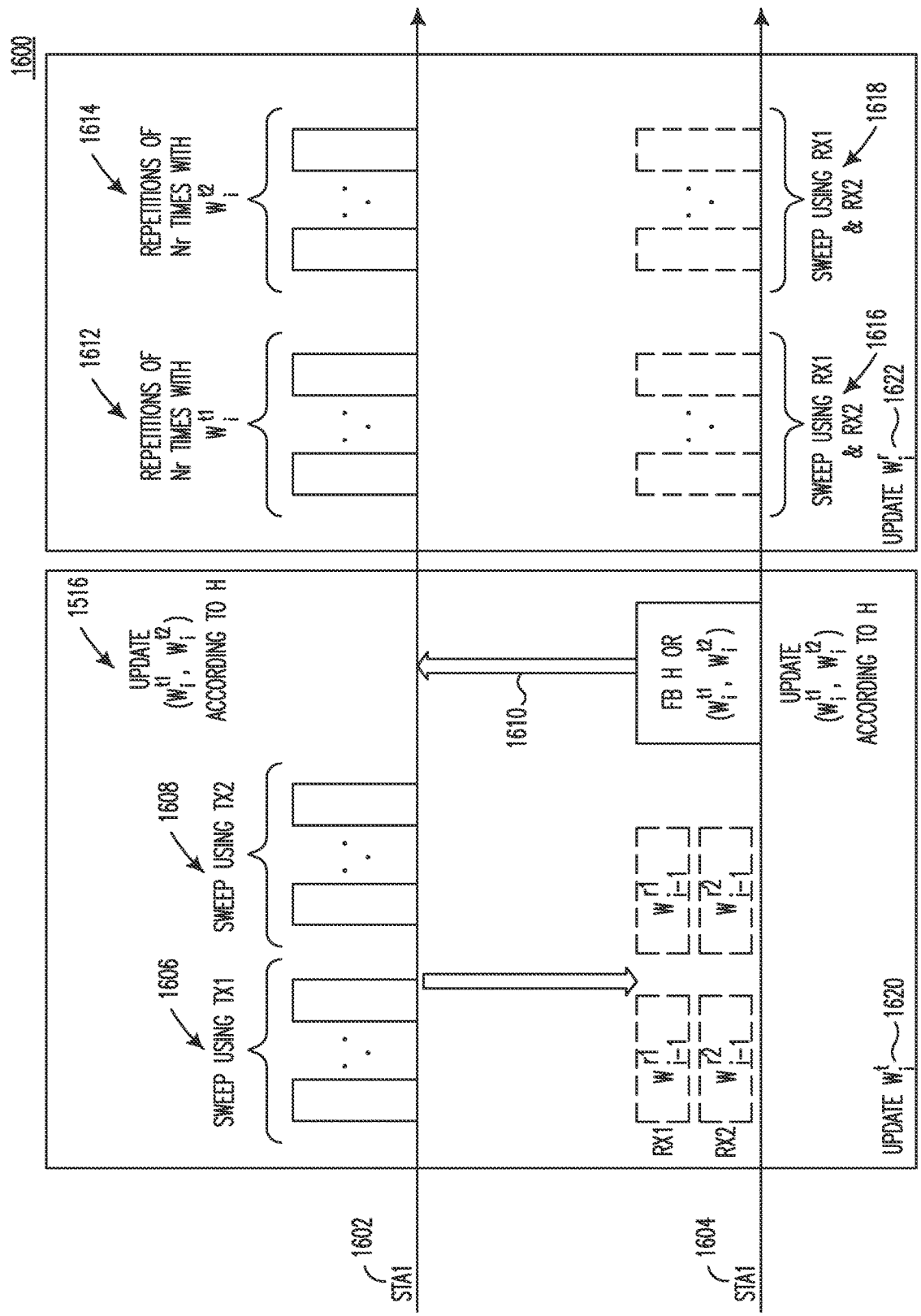
FIG. 16 is a diagram of an example beamforming training method for Type I devices and for Type II devices without calibration.

FIG. 16 is a diagram of an example beamforming training method 1600 for Eigen-beamforming based spatial multiplexing for Type I devices and for Type II devices without calibration. For iteration i, STA1 1602 (initiator) may transmit Nt repetitions of training sequences sweeping all the transmit antenna elements in a first antenna sub-group using the first transmit RF chain (TX1) 1606. Then STA1 1602 may transmit Nt repetitions of training sequences sweeping all the transmit antenna elements in the second antenna sub-group using the first transmit RF chain (TX2) 1608. STA1 1602 may also use an orthorgonal precoding matrix to transmit the Nt repetitions of training sequences. The first antenna sub-group may be the same as the second antenna sub-group for Type I devices, STA1 1602; while for Type II devices, STA1 1602, they may correspond to different antenna elements.

STA2 (responder) 1604 may have the two receive beamforming weights trained from the previous iterations. If this is the first iteration, STA2 1604 may randomly select two beamforming weights, use Omni weights, or select the weights in an alternate manner. The first receive RF chain (RX1) may obtain a signal as the weighted combination of signals received from all antenna elements. The weight may be the first receive beamforming weight $W_{i-1}^{r1}$. Similarly, the second receive RF chain (RX2) may obtain a signal as the weighted combination of signals received from all the antenna elements. The weight may be the second receive beamforming weight $W_{i-1}^{r2}$. The sweeping of the Nr receive antennas 1616 and 1618 is shown in dashed lines as an example illustration of receiver operation. For example, to receive Nr packets from the transmitter, the receiver may receive a first packet with the first receive antenna, a second packet with the second receive antenna, and so on, until it receives a last packet with the last receive antenna. After converting them to baseband and digital domain, STA2 1604 may estimate the effective channel by comparing the received sequence with the known transmitted sequence. For time slot k, STA2 1604 may estimate two channels using two RF chains $$\begin{bmatrix} G_{k1} \\ G_{k2} \end{bmatrix}.$$

With 2Nt time slot, STA2 may receive $$\begin{bmatrix} G_{11} & \cdots & G_{2Nt1} \\ G_{12} & \cdots & G_{2Nt2} \end{bmatrix}.$$

The first half of the G matrix, $$G_{TX1} = \begin{bmatrix} G_{11} & \cdots & G_{Nt1} \\ G_{12} & \cdots & G_{Nt2} \end{bmatrix},$$

may correspond to TX1, and the second half of the G matrix, $$G_{TX2} = \begin{bmatrix} G_{(Nt+1)1} & \cdots & G_{2Nt1} \\ G_{(Nt+1)2} & \cdots & G_{2Nt2} \end{bmatrix},$$

may correspond to TX2. Applying the inverse of the orthorgonal precoding matrix to the first half and second half of G matrix respectively, STA2 1604 may obtain the channel from Nt transmit antenna elements with two transmit RF chains to two receive RF chains $$H = \begin{bmatrix} H_{11} & \cdots & H_{2Nt1} \\ H_{12} & \cdots & H_{2Nt2} \end{bmatrix}.$$

STA2 1604 may transmit channel information or beamforming weights for multiple data streams 1610 to STA1 1602. STA2 1604 may calculate the transmit beamforming weights to perform spatial multiplexing for STA1 1602, and transmit the weights 1610 to STA1 1602. STA2 1604 may transmit the channel H 1610 to STA1 1602, and STA1 1602 then may determine or calculate the transmit beamforming weights for itself 1620.

For example, the transmit beamforming weight method may be implementation dependent, and linear or non-linear procoding methods may be used. The updated transmit beamforming weights for ith iteration may be denoted as $(W_i^{r1}, W_i^{r2})$. STA1 1602 may transmit training sequences Nr times with beamforming weight $W_i^{r1}$ 1612. STA2 1604 may sweep through Nr receive antennas 1616, or apply an orthogonal matrix. STA2 1604 may pass the received signal to two RF chains. STA1 1602 may transmit training sequences 1614 again for Nr times with beamforming weight $W_i^{r2}$. STA2 1604 may repeat the same procedure with both RF chains 1618. The sweeping of the Nr receive antennas 1616 and 1618 is shown in dashed lines as an example illustration of receiver operation. For example, to receive Nr packets from the transmitter, the receiver may receive a first packet with the first receive antenna, a second packet with the second receive antenna, and so on, until it receives a last packet with the last receive antenna. STA2 1604 may estimate the channel and update the receive beamforming weight 1622 accordingly.

For example, the receive beamforming weight method may be implementation dependent, and may be repeated for several iterations until the algorithm converges or certain criteria have been met that indicate that spatial multiplexing is not suitable for the pair of devices, STA1 1602 and STA2 1604.

There may be several ways to define failure criteria to indicate that the pair of devices are not suitable for spatial multiplexing. For example, the failure criteria may include STA2 monitoring the rank or condition number of channel matrix when selecting beamforming weights, and feeding back this information to STA1. A second example of a failure criteria may include STA2 monitoring the rank or condition number of channel matrix while sweeping through Nr receive antennas or applying an orthogonal matrix, and feeding back this information to STA1.

If the rank is less than the number of data streams expected to be supported, or the condition number is greater than a certain threshold, both STA1 and STA2 may determine that the maximum number of data streams that may be supported does not meet the requirements. In this example, the pair of devices may determine to complete the training procedure, and perform RF selection at both transmitter and receiver later. Alternatively, the pair of devices may terminate the training with full set of RF chains, and return to performing beamforming training with a fewer number of RF chains. After training, they may transmit with a fewer number of spatial streams.

In some examples, methods for beam sweep based spatial multiplexing for Type I devices with calibration may be performed. For example, the method of beam sweep based spatial multiplexing may be similar to Eigen-Beamforming based spatial multiplexing. Examples using Eigen-Beamforming based spatial multiplexing may require that the channel estimate and the transmit/receive weights for spatial multiplexing may be determined based on the estimated channel, which may not necessarily be the same as one of the beams used for beamforming training. In beam sweep based spatial multiplexing, there may be no requirement for channel estimation. The device may select one or multiple beams from the set of beams used for beam sweep training. For example, implementation of beam sweep based beamforming may be easier than Eigen-Beamforming based beamforming. The performance of the beam sweep based methods may be sub-optimum compared to the Eigen-beamforming based methods.

Figure 17:
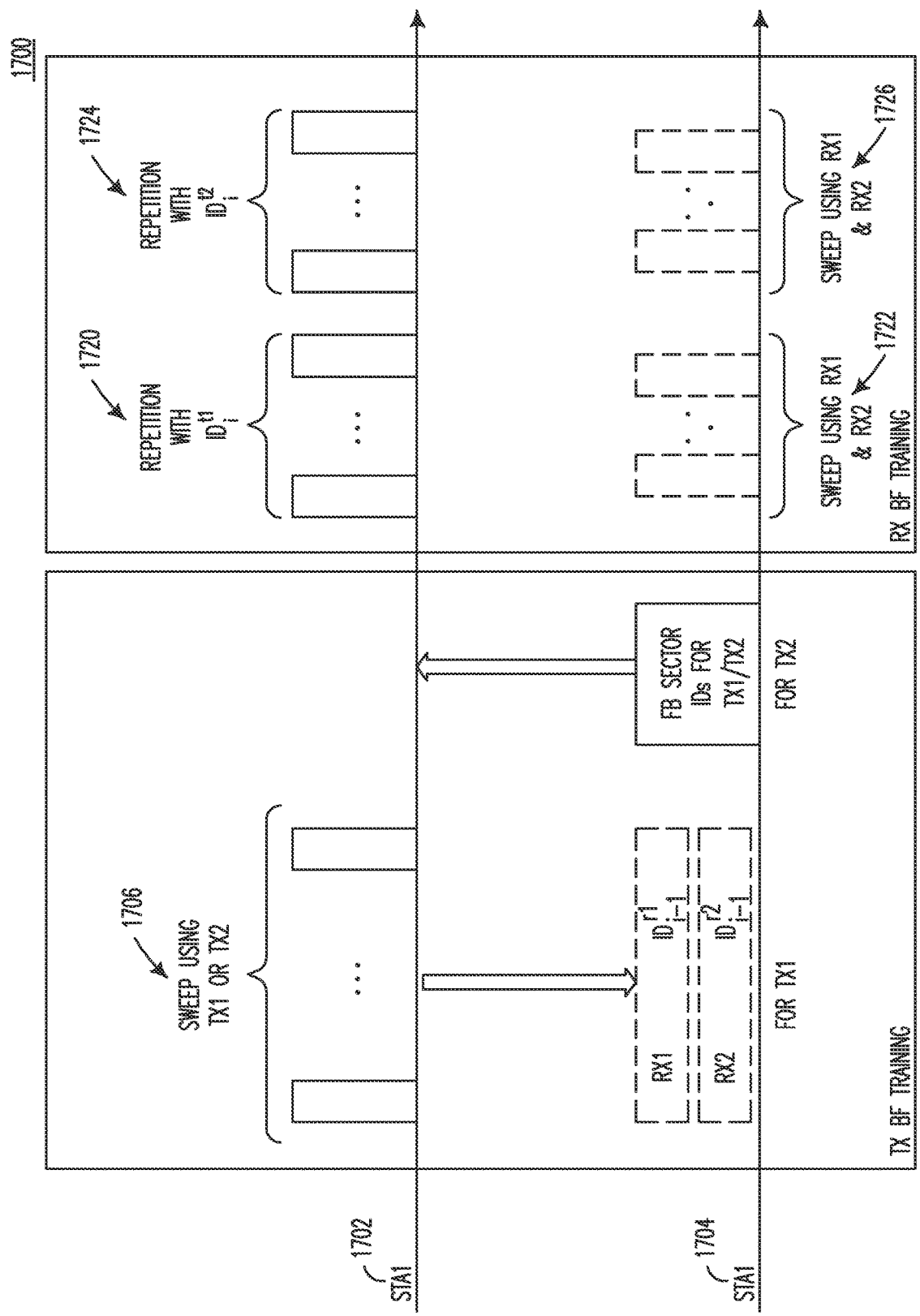
FIG. 17 is a diagram of an example beamforming training method for beam sweep based spatial multiplexing for Type I devices with calibration between two TX chains.

FIG. 17 is a diagram of an example beamforming training method 1700 for beam sweep based spatial multiplexing for Type I devices with calibration between two TX chains. Referring to FIG. 17, for iteration i, STA1 (initiator) 1702 may transmit N repetitions of training sequences 1706 sweeping the transmit beams it intends to train. In these examples, N may not necessarily be related to the number of transmit antennas. The transmission 1706 may be performed using the first transmit RF chain (TX1) or the second transmit RF chain (TX2). The two RF chains may be identical or different by a scalar. In some examples, the two TX chains may have been calibrated.

STA2 (responder) 1704 may have the two receive beams trained from the previous iterations. If this is the first iteration, STA2 1704 may randomly select two beams, use Omni weights, or select initial values in an alternate manner. The first receive RF chain (RX1) of STA2 1704 may obtain a signal as the weighted combination of signals received from all antenna elements. The weight may be the first receive beamforming weight $W_{i-1}^{r1}$. Similarly, the second receive RF chain (RX2) of STA2 1704 may obtain a signal as the weighted combination of signals received from all the antenna elements. The weight may be the second receive beamforming weight $W_{i-1}^{r1}$. $\{W_{i-1}^{r1}, W_{i-1}^{r2}\}$ may be the weights corresponding to beam indices $\{ID_{i-1}^{r1}, ID_{i-1}^{r2}\}$. After converting them to baseband and digital domain, STA2 1704 may measure the effective SNR or equivalent parameters. For time slot k, STA2 1704 may perform SNR measurements using two receive RF chains $$\begin{bmatrix} SNR_{k1} \\ SNR_{k2} \end{bmatrix}.$$

With N time slots, STA2 1704 may receive $$\begin{bmatrix} SNR_{11} & \ldots & SNR_{N1} \\ SNR_{12} & \ldots & SNR_{N2} \end{bmatrix}.$$

In FIG. 17, the reception of the signals is shown in dashed lines as an example illustration of the receiver operation while receiving a packet.

STA2 1704 may feedback two beam indices to STA1 1702. The beam selection method may be implementation dependent. For example, the STA2 1704 may choose the pair of indices $(ID_i^{r1}, ID_i^{r2})$ which may satisfy $ID_i^{r1}=\arg\max_k (SNR_{k1}^{TX}-SNR_{k2}^{TX})$, and $ID_i^{r2}=\arg\max_k(SNR_{k2}^{TX}-SNR_{k1}^{TX})$.

The updated transmit beam indices for the ith iteration may be $(ID_i^{r1}, ID_i^{r2})$. STA1 1702 may transmit a training sequence for M times with beam $ID_i^{r1}$ 1720. STA2 1704 may sweep through M receive beams with both receive RF chains (RX1 and RX2) 1722. STA1 1702 may transmits a training sequence again for M times with beamforming weight $ID_i^{r2}$ 1724. STA2 1704 may repeat the similar procedure with both RF chains 1726. The sweeping of the receive antennas 1722 and 1726 is shown in dashed lines as an example illustration of receiver operation. For example, to receive packets from the transmitter, the receiver may receive a first packet with the first receive antenna, a second packet with the second receive antenna, and so on, until it receives a last packet with the last receive antenna. STA2 1704 may measure the SNR or equivalent parameters and update the receive beam index accordingly. The receive beam selection method may be implementation dependent. For example, M may be the number of receive beams STA2 1704 intends to train and it may not necessarily be related to a number of receive antennas at STA2 1704. The method may be repeated until the method converges or certain criteria have been met that indicates that spatial multiplexing is not suitable for the pair of devices.

Failure criteria may be defined in several different ways. For example, failure criteria may indicate that the pair of devices is not suitable for spatial multiplexing. In one example, the failure criteria may be defined as when STA2 1704 may record $\Delta_{11}^{SNR}=\max_k(SNR_{k1}^{TX}-SNR_{k2}^{TX})$ and $\Delta_{12}^{SNR}=\max_k(SNR_{k2}^{TX}-SNR_{k1}^{TX})$ when selecting beams, and feedback this information to STA1 1702. In another example, STA2 1704 may record $\Delta_{21}^{SNR}=\max_{1 \le k \le N}(SNR_{k1}^{RX}-SNR_{k2}^{RX})$ and $\Delta_{22}^{SNR}=\max_{N<k\le 2N}(SNR_{k2}^{RX}-SNR_{k1}^{RX})$ when sweeping beams, and feedback this information to STA1 1702.

If $\Delta_{ij}^{SNR}$ is smaller than a certain threshold, both STA1 1702 and STA2 1704 may determine that the channel cannot provide enough spatial diversity to support two data streams. In this example, STA1 1702 and STA2 1704 may determine to complete the training procedure, and perform RF selection at both transmitter and receiver. STA1 1702 and STA2 1704 may terminate the training with two RF chains, and return to performing beamforming training with one RF chain. After training, they may transmit with a fewer number of spatial streams. For example, more than two data streams may be determined.

Figure 18:
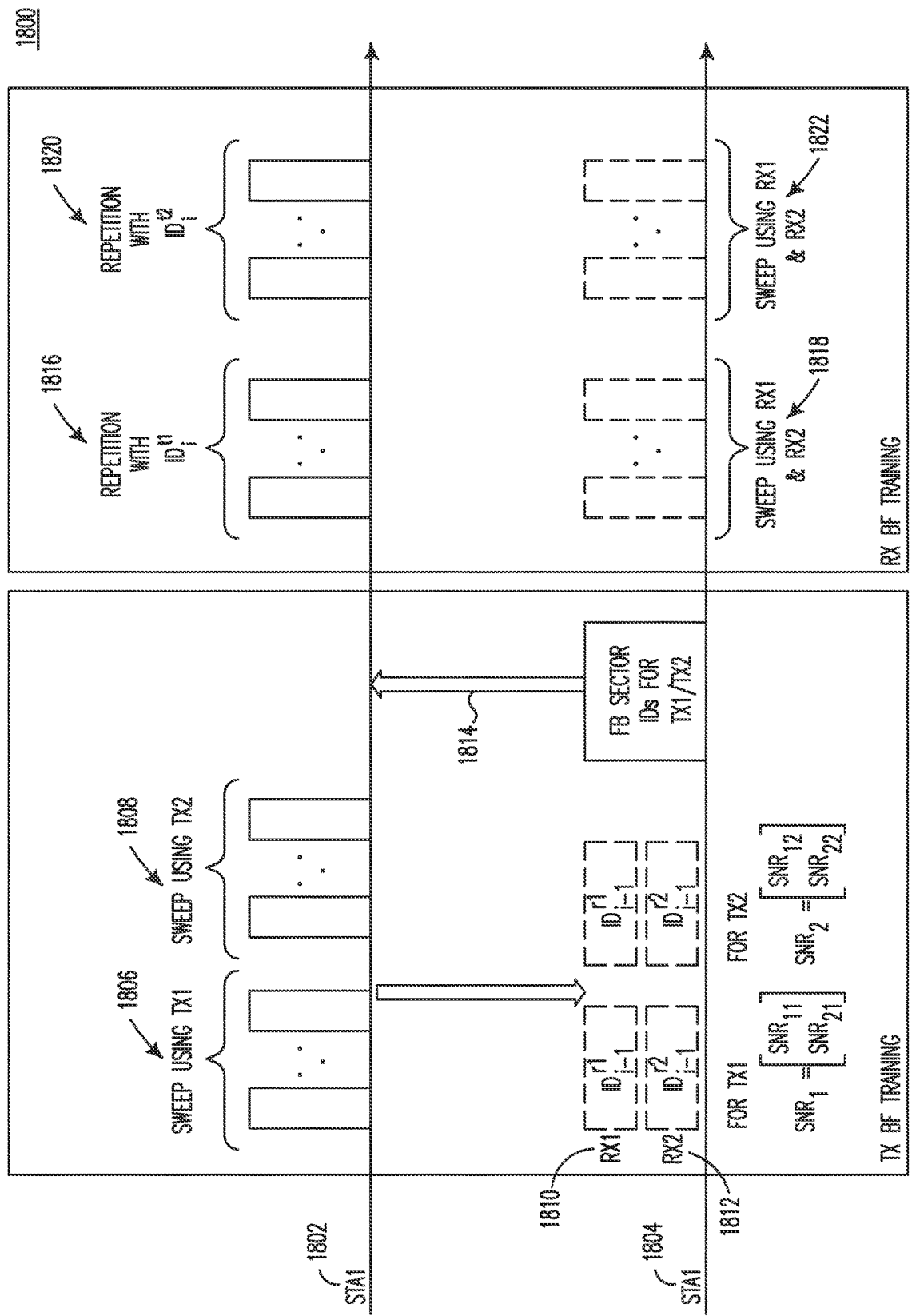
FIG. 18 is a diagram of an example beamforming training method for beam sweep based spatial multiplexing Type II devices and Type I devices without calibration.

Beam sweep based spatial multiplexing for Type II devices and Type I devices without calibration may be performed. FIG. 18 is a diagram of an example beamforming training method 1800 for beam sweep based spatial multiplexing Type II devices and Type I devices without calibration.

For iteration i, STA1 (initiator) 1802 may transmit N repetition of training sequences sweeping all the transmit beams it intends to train using the first transmit RF chain (TX1) 1806. Then STA1 1802 may repeat the same procedure with the second RF chain (TX2) 1808. N may not necessarily be related to the number of transmit antennas. For example, the beam pattern used for TX1 may not be the same as that for TX2.

STA2 (responder) 1804 may have the two receive beams trained from the previous iterations. If this is the first iteration, STA2 1804 may randomly select two beams, use Omni weights, or select the two beams in a different way. The first receive RF chain (RX1) 1810 may obtain a signal as the weighted combination of signals received from all antenna elements. The weight may be the first receive beamforming weight $W_{i-1}^{r1}$. The second receive RF chain (RX2) 1812 may obtain a signal as the weighted combination of signals received from all the antenna elements. The weight may be the second receive beamforming weight $W_{i-1}^{r2}$. For example, $\{W_{i-1}^{r1}, W_{i-1}^{r2}\}$ may be the weights that correspond to beam indices $\{ID_{i-1}^{r1}, ID_{i-1}^{r2}\}$. After converting them to baseband and digital domain, STA2 1804 may measure the effective SNR or equivalent parameters. For time slot k, STA2 1804 may perform SNR measurements using two receive RF chains $$\begin{bmatrix} SNR_{k1} \\ SNR_{k2} \end{bmatrix}.$$

With the first N time slot, STA2 1804 may receive $$\begin{bmatrix} SNR_{11} & \ldots & SNR_{N1} \\ SNR_{12} & \ldots & SNR_{N2} \end{bmatrix},$$

which may correspond to TX1 of STA1 1802. With the last N time slots, STA2 1804 may receive $$\begin{bmatrix} SNR_{(N+1)1} & \ldots & SNR_{2N1} \\ SNR_{(N+1)2} & \ldots & SNR_{2N2} \end{bmatrix},$$

which may correspond to TX2 of STA1 1802. In FIG. 18, the reception of the signals is shown in dashed lines as an example illustration of the receiver operation while receiving a packet.

STA2 1804 may feedback two beam indices 1814 to STA1 1802. The beam selection method may be implementation dependent. For example, the STA2 1804 may select the pair of indices ($ID_i^{t1}$, $ID_i^{t2}$) which may satisfy $ID_i^{t1} = \arg\max_{1 \leq k \leq N}(SNR_{k1}^{TX} - SNR_{k2}^{TX})$ and $ID_i^{t2} = \arg\max_{N < k \leq 2N}(SNR_{k2}^{TX} - SNR_{k1}^{TX})$.

The updated transmit beam indices for ith iteration may be ($ID_i^{t1}$, $ID_i^{t2}$). STA1 1802 may transmit a training sequence M times with beam $ID_i^{t1}$ 1816. STA2 1804 may sweep through M receive beams with both receive RF chains (RX1 and RX2) 1818. STA1 1802 may transmit a training sequence again M times with beamforming weight $ID_i^{t2}$ 1820. STA2 1804 may repeat the same procedure with both RF chains 1822. The sweeping of the receive antennas 1818 and 1822 is shown in dashed lines as an example illustration of receiver operation. For example, to receive packets from the transmitter, the receiver may receive a first packet with the first receive antenna, a second packet with the second receive antenna, and so on, until it receives a last packet with the last receive antenna. STA2 1804 may measure the SNR or equivalent parameters and update the receive beam index accordingly. The receive beam selection method may be implementation dependent. For example, M may be the number of receive beams STA2 1804 intends to train and may not necessarily be related to the number of receive antennas at STA2 1804.

The procedure may be repeated for several iterations until the method converges or certain criteria have been met that indicates that spatial multiplexing is not suitable for STA1 1802 and STA2 1804.

There may be several ways to define failure criteria that indicate that the pair of devices are not suitable for spatial multiplexing. For example, the failure criteria may be defined as when STA2 1804 may record $\Delta_{11}^{SNR} = \max_{1 \leq k \leq N}(SNR_{k1}^{TX} - SNR_{k2}^{TX})$ and $\Delta_{12}^{SNR} = \max_{N < k \leq 2N}(SNR_{k2}^{TX} - SNR_{k1}^{TX})$ in when selecting beams, and feedback this information to STA1 1802. In another example failure criteria, STA2 1804 may record $\Delta_{21}^{SNR} = \max_{1 \leq k \leq N}(SNR_{k1}^{RX} - SNR_{k2}^{RX})$ and $\Delta_{22}^{SNR} = \max_{N < k \leq 2N}(SNR_{k2}^{RX} - SNR_{k1}^{RX})$ in when sweeping beams, and feedback this information to STA1 1802.

If $\Delta_{ij}^{SNR}$ is smaller than a threshold, both STA1 1802 and STA2 1804 may determine that the channel cannot provide enough spatial diversity to support two data streams. In this example, the pair of devices may determine to complete the training procedure, and perform RF selection at both transmitter and receiver. Alternatively, the pair of devices may terminate the training with two RF chains, and return to performing beamforming training with one RF chain. After training, the pair of devices may transmit with a fewer number of spatial streams.

The beam refinement transaction discussed in conjunction with FIG. 3 may be used for Eigen-beamforming based spatial multiplexing methods disclosed above. Modifications may be applied to support spatial multiplexing. For example, a number of spatial streams may be defined. The number of data streams may be defined in a DMG beam refinement element. The FBCK-TYPE subfield in the DMG beam refinement element may be modified.

FIG. 19 is a diagram of an example modified FBCK-TYPE subfield 1900. The modified FBCK-TYPE subfield 1900 may be included in a DMG refinement element. The modified FBCK-TYPE subfield 1900 may include a SNR present field 1910, a channel measurement present field 1920, a tap delay present field 1930, a number of taps present field 1940, a number of measurement field 1950, a number of spatial streams field 1960, a sector ID order present field 1970, and a number of beams field 1980.

An initiator may determine the capabilities of the responder prior to initiating beamforming training with the responder by using an Eigen-beamforming based spatial multiplexing capability. The Beam sweep based spatial multiplexing capability may be indicated in a DMG capabilities element. The DMG capabilities element may be present in an association request, association response, re-association request, re-association response, probe request and probe response frames and may be present in DMG beacon and information request and response frames. One bit of Eigen-beamforming based spatial multiplexing indication and one bit of beam sweep spatial multiplexing capability may be used to indicate that the STA is capable of performing Eigen-beamforming based spatial multiplexing.

The type of beamforming training algorithm, such as Eigen-beamforming based and beam sweep based, may be indicated in DMG beam refinement element. In addition, transceiver architecture type, such as Type I and Type II may be indicated in a DMG capabilities element.

A precoding matrix utilized by the initiator in the first part of each iteration may be predefined and agreed on by both initiator and responder if Eigen-beamforming based spatial multiplexing is implemented. In this example, the initiator and responder may negotiate which matrix to utilize before the beamforming training. For example, the precoding matrix index may be defined and transmitted in a BRP request field. In addition, a set of unitary precoding matrices may be predetermined.

A number of antennas at both initiator and responder may be signaled if Eigen-beamforming based spatial multiplexing is implemented. The number of antennas may be signaled in the PHY header, MAC header or a BRP Request field.

A spatial multiplexing frame format may be implemented. For example, when a packet is transmitted using spatial multiplexing, an indication may be sent to inform the packet recipients that multiple streams were transmitted. The MCS may be redefined for a modulation/coding scheme and the number of spatial streams. In 802.11ad, for example, MCS 0 may be the Control PHY; MCS 1-12 may be utilized for single carrier (SC) PHY; MCS 13-24 may be for OFDM PHY; and MCS 25-31 may be for low power SC PHY.

In examples with two data stream transmissions, the following may be defined for use by the communication devices. For example, MCS 32-43 may be for SC PHY, MCS 44-55 may be for OFDM PHY, and 56-62 may be for low power SC PHY. In some examples, the MCS mapping may not be the same as defined above.

Alternatively, the number of spatial streams may be indicated in a PHY header. In order to support multiple data streams, the PHY layer frame format may need to be modified.

FIGS. 20A, 20B, and 20C are diagrams of example PHY layer frame formats. With SC PHY, the data field may be composed of symbol blocks, while with OFDM PHY, the data field may be composed of OFDM symbols. The frame may be appended with TRN-T/R subfields, and may be utilized for beam refinement protocol.

Referring to FIG. 20A, short training field (STF) 2010, channel estimation field (CE) 2020 and PHY headers 2030 may be transmitted with a weight, W1 2040. The number of data streams supported, N, may be indicated in the PHY header. If more than one data stream will be transmitted, additional CE field(s) may be included. With N data streams, an extra N−1 CE field 2050 may be transmitted and weights W2 2060, . . . , WN 2070 may be applied to each CE field. An orthogonal mapping matrix, such as the P matrix defined in 802.11n/ac, may be applied. If a cyclic shift delay (CSD) scheme is applied to spatial multiplexing, the same CSD parameters may be applied to the CE fields. The data field 2080 that follows may be transmitted using the spatial multiplexing scheme, and all of the weights (W1, . . . , WN) 2090 may be applied.

FIG. 20B is a diagram of another example preamble format for spatial multiplexing transmissions. This format is similar to FIG. 20A except that an AGC field 2015 may be inserted after additional CE fields and before the data field 2080. The AGC field 2015 may use the same sequence as an LTF field, or it may be redesigned. The purpose of this AGC field 2015 may be for automatic gain control. The transmission of the AGC field 2015 may be in the same format as the data field 2080, i.e., weights (W1, . . . , WN) 2090 may be applied. The same CSD parameters may be applied to AGC field 2015 if CSD is utilized for data transmissions.

FIG. 20C is a diagram of another example preamble format for spatial multiplexing transmissions in which the number of data streams may be signaled implicitly. STF 2010 may be transmitted using all the weights (W1, . . . , WN) 2025. The first CE field 2020 following STF 2010 may be transmitted using the first weight W1 2040. The number of data streams may be implicitly indicated by using STF 2010 and the first CE field 2020. For example, several CE sequences may be defined, and each sequence may correspond to a certain number of data streams. Additional N−1 CE fields 2050 may follow the first CE field 2020 and transmitted with weights W2 2060 to WN 2070. The header 2035 may be transmitted with one of the weights or a combination of the weights similar to STF 2010. The spatial multiplexing transmission may be transmitted following the additional CE fields.

Beamforming training overhead and latency may be reduced. For example, sector sweep (SSW) frames and related training methods may be modified.

In the SLS procedures, SSW frames may be utilized for transmit and receive beamforming training. For example, the SSW frames may be transmitted in N time slots. For transmit beamforming training, SSW frames may be transmitted and multiple antenna sectors may be swept. The receiver may receive the SSW frames with the same antenna sector and feedback the best transmit sector ID to the transmitter. For example, for receive beamforming training, the same SSW frames may be repeated N times, and the receiver may sweep over multiple antenna sectors to receive. After the receive beamforming training, the receiver may select the best receive sector.

Each SSW frame may comprise a full PLCP header that may include a preamble, one or more header blocks, and a MAC frame. Since the SSW frames may be utilized for beamforming training, they may be transmitted using the lowest data rate, for example, control PHY or MCS0 in 802.11ad. SSW frames may not contain data traffic, therefore SSW frame sequences may be beamforming training overhead.

Figure 21:
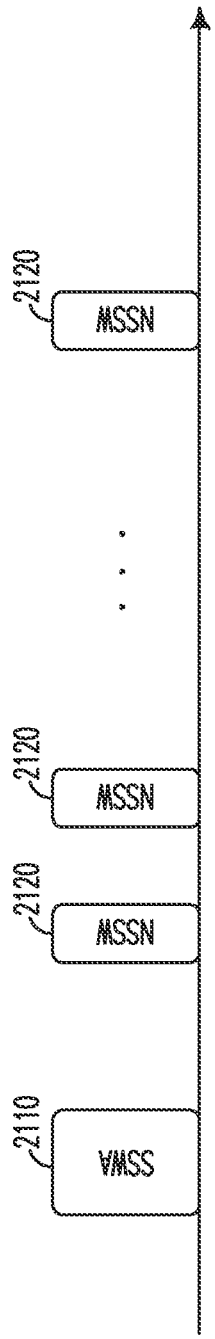
FIG. 21 is a diagram of an example modified SSW training frames and sequence.

FIG. 21 is a diagram of an example modified SSW training frames and sequence 2100. In this example, modified SSW training sequences may be utilized. A SSW announcement (SSWA) frame 2110 may be transmitted at the beginning of the SSW training sequences. The SSWA frame 2110 may contain all the information used to transmit by SSW frames. One or more N null SSW (NSSW) frames 2120 may follow the SSWA frame 2110 with a certain inter-frame spacing. NSSW frames 2120 may contain only preamble and PHY headers, and no MAC frame.

Figure 22:
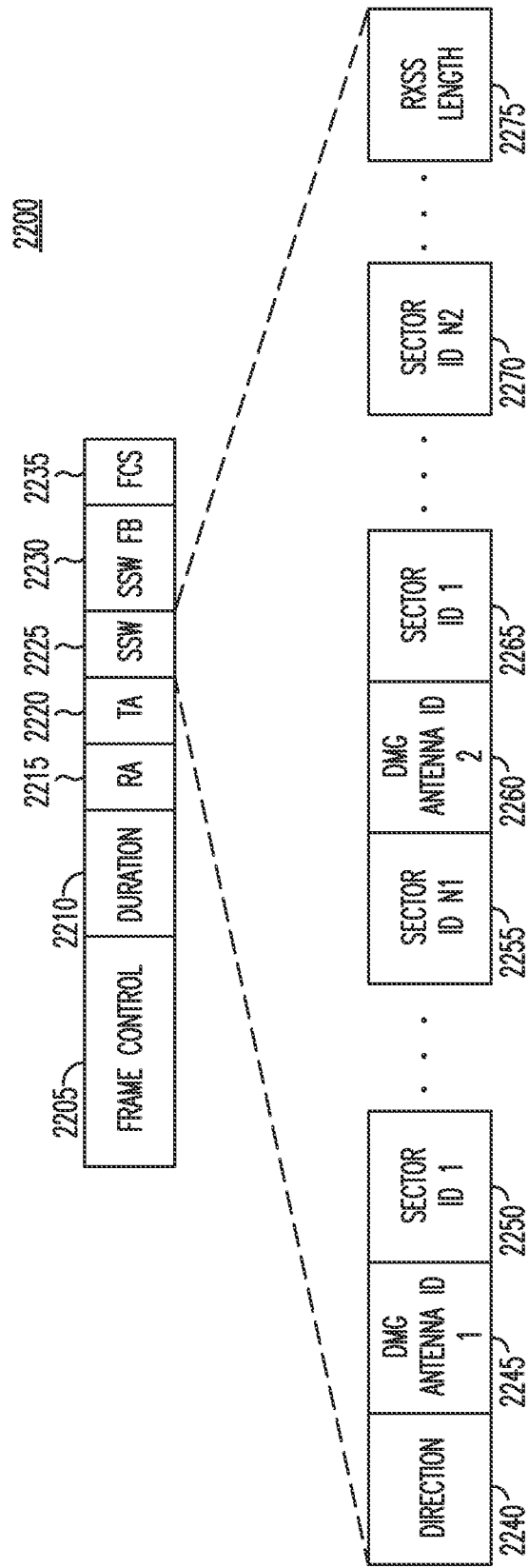
FIG. 22 is a diagram of an example SSWA frame format.

FIG. 22 is a diagram of an example SSWA frame format 2200. The SSWA frame format 2200 may include a frame control field 2205, a duration field 2210, an RA field 2215, a TA field 2220, an SSW field 2225, an SSW feedback (FB) field 2230, and an FCS field 2235. The SSW field 2225 may include a direction subfield 2240, a DMG antenna ID 1 subfield 2245, a sector ID 1 subfield 2250, a sector ID N subfield 2255, a DMG antenna ID 2 subfield 2260, a sector ID 1 subfield 2265, a sector ID N2 subfield 2270, and an RXSS length subfield 2275. In this example, sector ID 1 subfield 2250 may be for DMG antenna ID 1, and sector ID 1 subfield 2265 may be for DMG antenna ID 2.

The direction subfield 2240 and the RXSS length subfield 2275 may be the same as in IEEE 802.11ad. The direction subfield 2240 may be set to 0 to indicate that the frame is transmitted by the beamforming initiator and set to 1 to indicate that the frame is transmitted by the beamforming responder. The RXSS Length subfield 2275 may be valid only when transmitted in a CBAP and may be reserved otherwise. The RXSS Length subfield 2275 may specify the length of a receive sector sweep as required by the transmitting STA, and may be defined in units of an SSW frame. The value of this field is in the range 0-62, with odd values being reserved.

DMG Antenna IDs and Sector IDs may be utilized to indicate the antenna pattern for the following NSSW frames. For example, the first NSSW frame may utilize DMG Antenna ID 1 and Sector ID 1 to transmit, and the second NSSW frame may utilize DMG Antenna ID 1 and Sector ID 2 to transmit, and so on. With DMG antenna ID k, there may be Nk sectors swept for this round of beamforming training. The total number of NSSW frames following this SSWA frame may be $$\sum_{k=1}^{K} N_k.$$

K may be the number of DMG antennas trained with these SSWA-NSSW sequences.

The SSWA may be transmitted as follows. For example, the SSWA frame may carry all the MAC information necessary for beamforming training. It may be important that the receiver decodes the SSWA frame correctly. The SSWA frame may be transmitted using one of the following methods. For example, if the beamforming training is between two non-AP/PCP devices, the SSWA frame may be transmitted from AP to the two devices. In another example, if both the beamforming initiator and responder are multi-band capable, they may operate on multiple frequency bands simultaneously, and the SSWA frame may be transmitted on another frequency band. The SSWA frame may be transmitted with low data rate, spreading codes, or repetition schemes.

Some examples may use sub-optimum SLS training methods. In these examples, SLS training methods may be terminated early.

Figure 23:
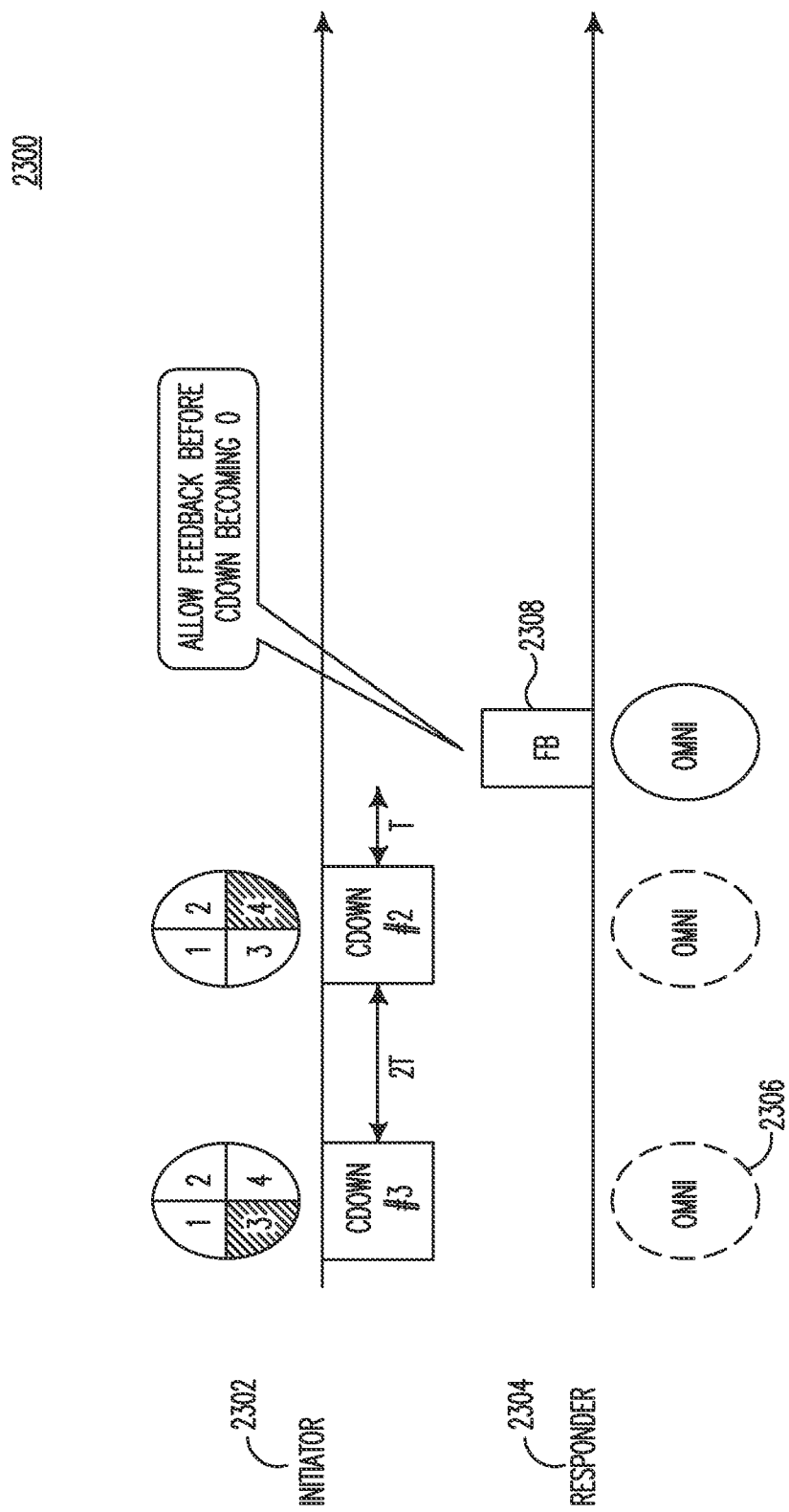
FIG. 23 is a diagram of an example early termination of the SLS training procedure.

FIG. 23 is a diagram of an example early termination of the SLS training procedure. In this example, the initiator 2302 may have 4 beam sectors to train, and the countdown (CDOWN) number may equal 3 in the first training frame. In this example, sector 3 is shaded to illustrate that the initiator may use sector 3 for transmission in a first period, and sector 4 is shaded to illustrate that the initiator may use sector 4 for transmission in the second period. The initiator 2302 may continue transmitting training frames which are separated by inter-frame space duration 2T, for example. The responder 2304 may monitor the received training frames 2306. The dashed "omni" circles in FIG. 23 are shown to illustrate that the receiver/responder may be in an omni-receiving mode. An omni-receiving mode may be enabled by an omni-directional receiving antenna. The first two "omni" circles are shown in dashed lines to illustrate that they are example receiver operations. The last "omni" circle is shown in indicating solid line to illustrate that this is an example transmitter operation, i.e., the feedback packet may be transmitted in an omni-transmitting mode, which may be enabled by an omni-directional transmitting antenna. Once the received SNR (or other parameters) is greater than a certain threshold, the responder 2304 may determine to terminate the training procedure by transmitting a feedback frame 2308. The feedback frame 2308 may be transmitted after a T duration from the end of a training frame transmitted by the initiator 2302. Thus the initiator 2302 may detect the transmission of this feedback and stop transmitting more training frames. This example may be used for both transmit and receive beamforming training.

A group based SLS training method may be performed. In this example, a STA may divide its sectors to groups. The partition of sectors may be implementation dependent. For example, the partition may be based on the direction of the sectors. The beamforming initiator may select one group to perform SLS training and wait for the feedback from the responder. Once the feedback from responder meets the expectation of the initiator, the beamforming initiator may determine to stop the beamforming training. Otherwise, the initiator may select another group to perform SLS training until one beam is selected or all the beams are swept.

Multi-beam, multi-DMG antenna sector level sweep feedback may be performed. In examples of the sector level sweep method, the receiver STA may report back the best beam only, for example, one sector of one DMG antenna. For example, a list of the best beams, such as multiple beams of multiple antennas may be reported. This may enable the communication link to track the relative performance of the beams over time and, if necessary, switch to a better beam without the need for retraining.

Figure 24:
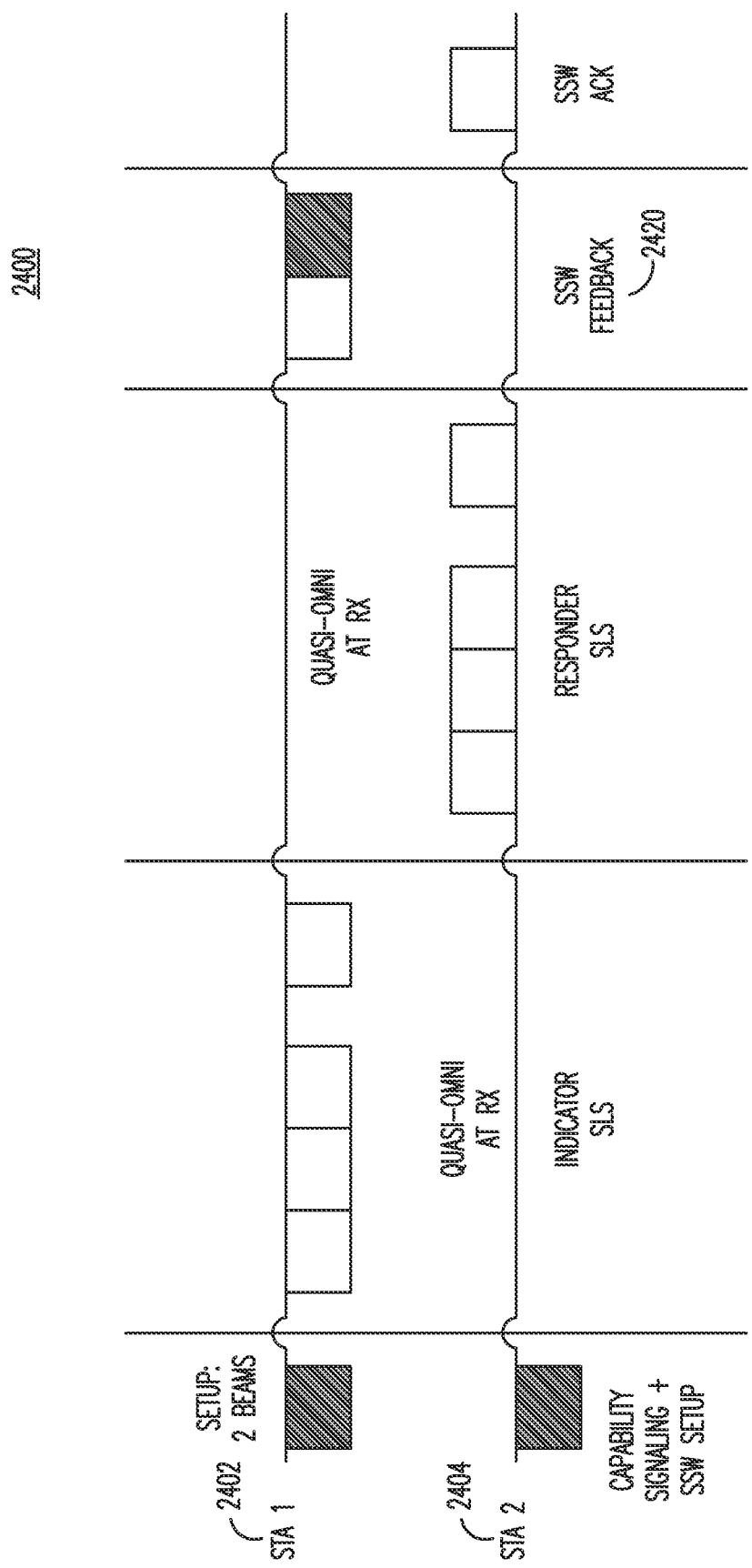
FIG. 24 is a diagram of an example multi-beam multi-DMG antenna SLS feedback method.

FIG. 24 is a diagram of an example multi-beam multi-DMG antenna SLS feedback method 2400. The following method 2400 may use a sector level sweep method that may report a list of best beams. In this example, the DMG transmitting STA1 2402 and receiving STA2 2404 may indicate their capability to support multi-sector, multi-DMG antenna Sector Sweep (SSW) feedback. This capability may be indicated by a bit in the DMG STA Capability Information field. STAs that do not have the capability may fall back to legacy transmission.

The STA initiating the sector sweep, for example STA1 2402, may transmit information to the responder STA, for example STA2 2404, indicating the number of beams to be fed back. The responder STA 2404 may also transmit information to initiator STA 2402 on the number of beams to be fed back. The metric to decide on the best beams may be implementation dependent. One signaling method may use a Transmit Sector Sweep frame for both the initiator and the responder may contain the number of beams to be fed back. A second signaling method may use a DMG beacon that may contain a field that indicates the number of beams to be fed back for all SSW feedback 2420. In a third signaling method, before a Sector Level Sweep procedure, the initiator and responder may exchange SLS setup frames indicating the number of beams to feed back. Quasi-omni may refer to a near omni-directional transmission or reception. For example, quasi-omni transmissions may be enabled by repeatedly transmitting the same information using multiple directional transmissions, as if it were transmitted using an omni-directional transmit antenna. Similarly, quasi-omni receptions may be enabled by repeatedly receiving the same packet using multiple directional receptions, as if it were received using an omni-directional receiving antenna.

Both STAs may implement the legacy initiator and responder sector level sweep procedures. The transmitter may feedback the best N beams. This may be by one of the following example methods. In a first example method, multiple SSW Feedback fields may be aggregated within an SSW feedback frame 2420. In a second example, a single SSW Feedback field may be modified to enable feedback of multiple beams and DMG antennas and corresponding SNR Reports. In a third example, the best beam/antenna may be fed back during the SLS procedure and subsequent feedback of the additional N−1 beams with other transmissions, for example an ACK. In these examples, the number of antenna may be larger than the number radio frequency (RF) chains. In some examples, the number of antenna may be much larger than the number of RF chains.

EMBODIMENTS

1. A first communication device comprising:
a plurality of antennas;
a processor configured to partition the plurality of antennas;
a transmitter configured to transmit a plurality of frames to a second communication device;
and a receiver.

2. The first communication device of embodiment 1, wherein the processor is configured to partition the plurality of antennas into at least a first group of antennas and a second group of antennas.

3. The first communication device of embodiment 2, wherein the first group of antennas is associated with a first beam to a first station (STA).

4. The first communication device of embodiment 2 or 3, wherein the second group of antennas is associated with a second beam to a second station (STA).

5. The first communication device of any one of embodiments 2-4, wherein the first group of antennas is associated with a first beam to a first plurality of stations (STAs).

6. The first communication device of any one of embodiments 2-5, wherein the second group of antennas is associated with a second beam to a second plurality of stations (STAs).

7. The first communication device of any preceding embodiment, wherein the plurality of frames transmitted are beamforming training frames.

8. The first communication device of any preceding embodiment, wherein the plurality of frames are transmitted using the first group of antennas.

9. The first communication device of any preceding embodiment, wherein the plurality of frames are transmitted using the second group of antennas.

10. The first communication device of any preceding embodiment, wherein the receiver is configured to receive a first beamforming weight vector from the second communication device.

11. The first communication device of embodiment 10, wherein the first beamforming weight vector is for sending signals on the first group of antennas.

12. The first communication device of any preceding embodiment, wherein the receiver is configured to receive a second beamforming weight vector from the second communication device.

13. The first communication device of embodiment 12, wherein the second beamforming weight vector is for sending signals on the second group of antennas.

14. The first communication device of any one of embodiments 10-13, wherein the first beamforming weight vector is a strongest beam between the first communication device and the second communication device.

15. The first communication device of any one of embodiments 12-14, wherein the second beamforming weight vector is for a second strongest beam between the first communication device and the second communication device.

16. The first communication device of any preceding embodiment, wherein the first communication device is a wireless transmit/receive unit (WTRU).

17. The first communication device of any one of embodiments 1-15, wherein the first communication device is a station (STA).

18. The first communication device of any one of embodiments 1-15, wherein the first communication device is an access point (AP).

19. The first communication device of any one of embodiments 1-15, wherein the first communication device is a base station.

20. The first communication device of any preceding embodiment, wherein the second communication device is a wireless transmit/receive unit (WTRU).

21. The first communication device of any one of embodiments 1-19, wherein the second communication device is a station (STA).

22. The first communication device of any one of embodiments 1-19, wherein the second communication device is an access point (AP).

23. The first communication device of any one of embodiments 1-19, wherein the second communication device is a base station.

24. The first communication device of any one of embodiments 7-23, wherein the beamforming training frames are orthogonal beamforming vectors.

25. The first communication device of any preceding embodiment, wherein the transmitter is further configured to transmit a second set of beamforming training frames.

26. The first communication device of embodiment 25, wherein the second set of beamforming training frames is transmitted using the received first beamforming weight vector.

27. The first communication device of embodiment 25 or 26, wherein the second set of beamforming training frames is transmitted using the received second beamforming weight vector.

28. The first communication device of any preceding embodiment, wherein the receiver is further configured to receive a modified first beamforming weight vector.

29. The first communication device of embodiment 28, wherein the modified first weight vector is for sending signals on the first group of antenna.

30. The first communication device of any preceding embodiment, wherein the receiver is further configured to receive a modified second beamforming weight vector.

31. The first communication device of embodiment 30, wherein the modified second weight vector is for sending signals on the second group of antenna.

32. The first communication device of any preceding embodiment, wherein the first communication device comprises one or more radio frequency (RF) chains.

33. The first communication device of any preceding embodiment, wherein a number of the antenna is larger than a number of one or more radio frequency (RF) chains.

34. A first communication device comprising:
a plurality of antennas;
a receiver configured to receive a set of beamforming training frames;
a processor; and
a transmitter.

35. The first communication device of embodiment 34, wherein the processor is configured to determine a first transmit beamforming weight vector.

36. The first communication device of embodiment 35, wherein the first transmit beamforming weight vector corresponds to a first antenna group.

37. The first communication device of embodiment 36, wherein the first antenna group is for a second communication device.

38. The first communication device of any one of embodiments 34-37, wherein the processor is configured to determine a second transmit beamforming weight vector.

39. The first communication device of embodiment 38, wherein the second transmit beamforming weight vector corresponds to a second antenna group.

40. The first communication device of embodiment 39, wherein the second antenna group is for a second communication device.

41. The first communication device of any one of embodiments 34-40, wherein the transmitter is configured to transmit data using the first transmit beamforming weight vector to the second communication device to the second communication device.

42. The first communication device of any one of embodiments 34-41, wherein the transmitter is configured to transmit data using the second transmit data using the second transmit beamforming weight vector to the second communication device.

43. The first communication device of any one of embodiments 34-42, wherein the first communication device is a wireless transmit/receive unit (WTRU).

44. The first communication device of any one of embodiments 34-42, wherein the first communication device is a station (STA).

45. The first communication device of any one of embodiments 34-42, wherein the first communication device is an access point (AP).

46. The first communication device of any one of embodiments 34-42, wherein the first communication device is a base station.

47. The first communication device of any one of embodiments 34-46, wherein the second communication device is a wireless transmit/receive unit (WTRU).

48. The first communication device of any one of embodiments 34-46, wherein the second communication device is a station (STA).

49. The first communication device of any one of embodiments 34-46, wherein the second communication device is an access point (AP).

50. The first communication device of any one of embodiments 34-46, wherein the second communication device is a base station.

51. The first communication device of any one of embodiments 34-50, wherein the received beamforming training frames are orthogonal beamforming vectors.

52. The first communication device of any one of embodiments 34-51, wherein the transmitted beamforming weight vectors are orthogonal beamforming vectors.

53. A method for beamforming training for beam division multiple access (BDMA), the method comprising:
   receiving a first transmit beamforming weight from a first station (STA), and receiving a second transmit beamforming weight from a second (STA);
   transmitting Nt sequences modulated using Nt beamforming vectors, wherein the Nt sequences are modulated based on the first transmit beamforming weight and the second transmit beamforming weight.

54. The method of embodiment 53, wherein the Nt beamforming vectors are orthogonal.

55. A method for beamforming training for beam division multiple access (BDMA), the method comprising:
   receiving a plurality of Nt sequences using a first previous beamforming vector;
   determining a first transmit beamforming weight from an access point (AP) based on the first previous beamforming vector and the received plurality of Nt sequences; and
   transmitting the determined first transmit beamforming weight to the AP.

56. A method for beamforming training for spatial multiplexing, the method comprising:
   an initiator station having two radio frequency (RF) chains and having transmit antenna elements, the initiator station transmitting Nt known training sequences sweeping the transmit antenna elements;
   a responder station having a first and a second RF chain and having receive antenna elements, and having a first and a second receive beamforming weight, the responder station receiving the first RF chain and receiving the second RF chain; and
   the responder station estimating at least two channels by comparing the received first RF chain and the second RF chain to the Nt known training sequences.

57. The method of embodiment 56, wherein the first RF chain is the combination of signals received from the receive antenna elements weighted by the first receive beamforming weights 58. The method of embodiment 57, wherein the second RF chain is the combination of signals received from the receive antenna elements weighted by the second receive beamforming weights.

59. The method of any one of embodiments 56-58, wherein the transmitting Nt training sequences further comprises transmitting Nt training sequences over a first RF chain of the initiator.

60. The method of any one of embodiments 56-58, wherein the transmitting Nt training sequences further comprises transmitting Nt training sequences over a second RF chain of the initiator.

61. The method of any one of embodiments 56-58, wherein the transmitting Nt training sequences further comprises transmitting Nt training sequences over the first RF chain and the second RF chain.

62. The method of embodiment 61, wherein the first RF chain and the second RF chain are calibrated.

63. The method of any one of embodiments 56-62, wherein the transmitting Nt known training sequences sweeping the transmit antenna elements comprises the initiator station having two RF chains and having transmit antenna elements, transmitting Nt known training sequences sweeping the transmit antenna elements, wherein a number of the transmit antenna elements is larger than a number of RF chains.

64. The method of any one of embodiments 56-63, wherein the number of transmit antenna elements is at least six times larger than a number of RF chains.

65. The method of any one of embodiments 56-64 further comprising the responder transmitting the estimated two channels to the initiator.

66. A method for beamforming training for spatial multiplexing, the method comprising:
   an initiator station having two or more radio frequency (RF) chains and having transmit antenna elements, the initiator station transmitting Nt known sequences sweeping the transmit antenna elements;
   a responder station having a first and a second RF chain and having receive antenna elements, and having a first and a second receive beamforming weight, the responder station receiving the first RF chain and receiving the second RF chain; and
   the responder estimating at least two channels by comparing the received first RF chain and the second RF chain to the known Nt training sequences.

67. The method of embodiment 66, wherein the first RF chain is a combination of signals received from the receive antenna elements weighted by the first receive beamforming weights.

68. The method of embodiment 66 or 67, wherein the second RF chain is the combination of signals received from the receive antenna elements weighted by the second receive beamforming weights.

69. A method for performing beamforming, the method comprising:
   a first communication device transmitting a first plurality of beamforming training frames to a second communication device using a first beamforming vector;
   the first communication device receiving from the second communication device a second beamforming weight vector; and
   the first communication device transmitting a second plurality of beamforming training frames to the second communication device using the second beamforming vector.

70. The method of embodiment 69, wherein the first communication device transmits the first plurality of beamforming training frames to the second communication device using a first beamforming weight vector.

71. The method of embodiment 69 or 70, wherein the first communication device transmits a first portion of the first plurality of beamforming training frames using a first group of antenna and a first portion of the beamforming weights.

72. The method of any one of embodiments 69-71, wherein the first communication device transmits a second portion of the first plurality of beamforming training frames using a second group of antenna and a second portion of the beamforming weights.

73. A base station configured to perform any one of embodiments 53-72.

74. A base station configured to perform any portion of embodiments 53-72.

75. An integrated circuit configured to perform any one of embodiments 53-72.

76. An integrated circuit configured to perform any portion of embodiments 53-72.

77. A station (STA) configured to perform any one of embodiments 53-72.

78. A station (STA) configured to perform any portion of embodiments 53-72.

79. An access point (AP) configured to perform any one of embodiments 53-72.

80. An access point (AP) configured to perform any portion of embodiments 53-72.

81. A wireless transmit/receive unit (WTRU) configured to perform any one of embodiments 53-72.

82. A wireless transmit/receive unit (WTRU) configured to perform any portion of embodiments 53-72.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:
1. A first communication device comprising:
a plurality of antennas;
a processor configured to:
   determine a first path strength for a first path between the first communication device and a second communication device,
   determine a second path strength for a second path between the first communication device and the second communication device,
   determine that the first path strength is greater than the second path strength,
   partition the plurality of antennas into at least a first group of antennas and a second group of antennas,
   assign the first group of antennas to the first path, and assign the second group of antennas to the second path,
   wherein the first group of antennas is associated with a first beam to the second communication device, and
   wherein the second group of antennas is associated with a second beam to the second communication device;
a transmitter configured to transmit, to the second communication device, a plurality of beamforming training frames using the first group of antennas and the second group of antennas; and
a receiver configured to:
   receive, from the second communication device, a first beamforming weight vector for sending signals on the first group of antennas, and
   receive, from the second communication device, a second beamforming weight vector for sending signals on the second group of antennas.

2. The first communication device of claim 1, wherein the first beamforming weight vector is associated with a strongest beam between the first communication device and the second communication device, and wherein the second beamforming weight vector is associated with a second strongest beam between the first communication device and the second communication device.

3. The first communication device of claim 1, wherein at least one of the first communication device or the second communication device is a wireless transmit receive unit, a station (STA), an access point, or a base station.

4. The first communication device of claim 1, wherein each of the plurality of beamforming training frames is modulated using at least one orthogonal beamforming vector.

5. The first communication device of claim 1, wherein the transmitter is further configured to transmit a second plurality of beamforming training frames using the first beamforming weight vector and the second beamforming weight vector; and
wherein the receiver is further configured to receive, from the second communication device, a modified first beamforming weight vector for sending signals on the first group of antennas and to receive a modified second beamforming weight vector for sending signals on the second group of antennas.

6. The first communication device of claim 1, wherein the first communication device comprises one or more radio frequency (RF) chains, and wherein at least one of a number of the first group of antennas or a number of the second group of antennas is larger than a number of the one or more RF chains.

7. A first communication device comprising:
a plurality of antennas, wherein the plurality of antennas is configured to receive one beamforming training frame of a plurality of beamforming training frames; and
a processor configured to:
   determine a first path strength for a first path between the first communication device and a second communication device,
   determine a second path strength for a second path between the first communication device and the second communication device,
   determine that the first path strength is greater than the second path strength,
   partition the plurality of antennas into at least a first group of antennas and a second group of antennas,
   assign the first group of antennas to the first path, assign the second group of antennas to the second path, wherein the first group of antennas is associated with a first beam to the second communication device, and wherein the second group of antennas is associated with a second beam to the second communication device, determine a first transmit beamforming weight vector corresponding to a first antenna group of the second communication device, and determine a second transmit beamforming weight vector corresponding to a second antenna group of the second communication device; and a transmitter configured to:

transmit data using the first transmit beamforming weight vector to the second communication device, and transmit data using the second transmit beamforming weight vector to the second communication device.

8. The first communication device of claim 7, wherein at least one of the first communication device or the second communication device is a wireless transmit receive unit, a station (STA), an access point, or a base station.

9. The first communication device of claim 7, wherein each of the plurality of beamforming training frames comprises an orthogonal beamforming vector.

10. The first communication device of claim 7, wherein each of the beamforming weight vectors comprises an orthogonal beamforming vector.

11. A method for use in a first communication device, the method comprising:

determining a first path strength for a first path between the first communication device and a second communication device;

determining a second path strength for a second path between the first communication device and the second communication device;

determining that the first path strength is greater than the second path strength;

partitioning a plurality of antennas into at least a first group of antennas and a second group of antennas;

assigning the first group of antennas to the first path;

assigning the second group of antennas to the second path;

wherein the first group of antennas is associated with a first beam to a second communication device, and wherein the second group of antennas is associated with a second beam to the second communication device;

transmitting, to the second communication device, a plurality of beamforming training frames using the first group of antennas and the second group of antennas;

receiving, from the second communication device, a first beamforming weight vector for transmitting signals on the first group of antennas; and receiving, from the second communication device, a second beamforming weight vector for transmitting signals on the second group of antennas.

12. The method of claim 11, wherein the first beamforming weight vector is associated with a strongest beam between the first communication device and the second communication device, and wherein the second beamforming weight vector is associated with a second strongest beam between the first communication device and the second communication device.

13. The method of claim 11, wherein at least one of the first communication device or the second communication device is a wireless transmit receive unit, a a station (STA), an access point (AP), or a base station.

14. The method of claim 11, wherein each of the plurality of beamforming training frames is modulated using at least one orthogonal beamforming vector.

15. The method of claim 11 further comprising:

transmitting a second plurality of beamforming training frames using the first beamforming weight vector and the second beamforming weight vector;

receiving, from the second communication device, a modified first beamforming weight vector for transmitting signals on the first group of antennas; and receiving, from the second communication device, a modified second beamforming weight vector for transmitting signals on the second group of antennas.

16. The method of claim 11, wherein the plurality of beamforming training frames are transmitted using zero auto correlation, and further comprising receiving $$W_i^r = [\hat{H}_1^2, \hat{H}_2^2]^t$$

from the second communications device.

17. A method for use in a first communication device, the method comprising:

determining a first path strength for a first path between the first communication device and a second communication device;

determining a second path strength for a second path between the first communication device and the second communication device;

determining that the first path strength is greater than the second path strength;

partitioning a plurality of antennas into at least a first group of antennas and a second group of antennas, assigning the first group of antennas to the first path;

assigning the second group of antennas to the second path, wherein the first group of antennas is associated with a first beam to the second communication device, and wherein the second group of antennas is associated with a second beam to the second communication device;

receiving one training frame of a plurality of beamforming training frames on each antenna of the plurality of antennas;

determining a first transmit beamforming weight vector corresponding to a first antenna group of the second communication device;

determining a second transmit beamforming weight vector corresponding to a second antenna group of the second communication device;

transmitting data using the first transmit beamforming weight vector to the second communication device; and transmitting data using the second transmit beamforming weight vector to the second communication device.

18. The method of claim 17, wherein at least one of the first communication device or the second communication device is a wireless transmit receive unit, a station (STA), an access point (AP), or a base station.

19. The method of claim 17, wherein each of the plurality of beamforming training frames comprises an orthogonal beamforming vector.

20. The method of claim 17, wherein at least one of the first transmit beamforming weight vector or the second transmit beamforming weight vector is an orthogonal beamforming vector.

* * * * *